(12) United States Patent
Uota et al.

(10) Patent No.: US 8,979,052 B2
(45) Date of Patent: Mar. 17, 2015

(54) EXTERNAL MATERIAL CLAMP AND EXTERNAL MATERIAL CLAMPING STRUCTURE

(75) Inventors: Masaki Uota, Sakai (JP); Kouichi Tominaga, Nabari (JP)

(73) Assignee: Kmew Co., Ltd., Osaka (JP)

( * ) Notice: Subject to any disclaimer, the term of this patent is extended or adjusted under 35 U.S.C. 154(b) by 86 days.

(21) Appl. No.: 13/499,249

(22) PCT Filed: Sep. 30, 2010

(86) PCT No.: PCT/JP2010/067060
§ 371 (c)(1),
(2), (4) Date: Jun. 9, 2012

(87) PCT Pub. No.: WO2011/040515
PCT Pub. Date: Apr. 7, 2011

(65) Prior Publication Data
US 2012/0241574 A1      Sep. 27, 2012

(30) Foreign Application Priority Data

Sep. 30, 2009   (JP) .................................. 2009-227522

(51) Int. Cl.
*A47B 96/06*      (2006.01)
*E04G 5/06*       (2006.01)
(Continued)

(52) U.S. Cl.
CPC ......... *E04F 13/0846* (2013.01); *E04F 13/0801* (2013.01)
USPC .................. 248/231.81; 248/226.11; 248/300; 248/301; 248/304; 52/586.1; 52/511; 52/506.06; 52/62; 52/546; 403/13; 403/381

(58) Field of Classification Search
CPC .............. E04F 13/0846; E04F 13/0889; E04F 13/0826

USPC ................ 248/686, 549, 466, 475.1, 220.21, 248/220.22, 231.91, 231.81, 226.11; 52/546, 543, 715, 506, 506.08, 506.09; 403/13, 14, 381
See application file for complete search history.

(56) References Cited

U.S. PATENT DOCUMENTS 1,879,459 A * 9/1932 Pelton ........................... 403/217
4,684,305 A * 8/1987 Dubost ........................ 411/174
(Continued)

FOREIGN PATENT DOCUMENTS

JP      4-79130 U     7/1992
JP      2002-61373 A  2/2002
(Continued)

OTHER PUBLICATIONS

International Search Report for the Application No. PCT/JP2010/067060 mailed Nov. 9, 2010.

*Primary Examiner* — Jonathan Liu
*Assistant Examiner* — Muhammad Ijaz
(74) *Attorney, Agent, or Firm* — Cheng Law Group, PLLC

(57) ABSTRACT

The external material clamp comprises the fixed plate fixed to the foundation of the wall of the building, the horizontal plate extending forwardly from the center of the fixed plate, the upper support plate projected upwardly from the front end of the horizontal plate to support the upper side external wall with engagement, the lower support plate supporting the upper end of the external material 50 in the lower side with engagement, and the receiving plate at least a part of which is located above the horizontal plate to contact with the external material in the upper side with receiving a part of the load thereof. With this configuration, the load of the upper side external material is shared by the lower side external material and the receiving plate of the external material clamp.

24 Claims, 12 Drawing Sheets

(51) Int. Cl.

| | | |
|---|---|---|
| *E04F 13/08* | (2006.01) | |
| *A47B 96/00* | (2006.01) | |
| *A47K 1/00* | (2006.01) | |
| *A47K 5/00* | (2006.01) | |
| *F16L 3/08* | (2006.01) | |
| *F21V 21/00* | (2006.01) | |
| *F21V 35/00* | (2006.01) | |
| *A47H 1/10* | (2006.01) | |
| *F16B 45/00* | (2006.01) | |
| *E04B 2/00* | (2006.01) | |
| *E04B 1/38* | (2006.01) | |
| *E04C 1/40* | (2006.01) | |

(56) References Cited

U.S. PATENT DOCUMENTS

| | | | | |
|---|---|---|---|---|
| 4,771,974 A * | 9/1988 | Carlson | 248/231.81 |
| 6,315,489 B1 * | 11/2001 | Watanabe | 403/381 |
| 6,402,419 B1 * | 6/2002 | Watanabe | 403/381 |
| 6,446,409 B1 * | 9/2002 | Emerson | 52/712 |
| 6,598,362 B2 * | 7/2003 | Hikai | 52/235 |
| 6,615,560 B2 * | 9/2003 | Ito | 52/506.06 |
| 6,637,170 B2 * | 10/2003 | Ito | 52/506.06 |
| 6,830,405 B2 * | 12/2004 | Watanabe | 403/14 |
| 7,398,623 B2 * | 7/2008 | Martel et al. | 52/489.2 |
| 7,748,188 B2 * | 7/2010 | Ito | 52/506.06 |
| 7,918,065 B2 * | 4/2011 | Ito | 52/506.05 |
| D656,393 S * | 3/2012 | Honda | D8/382 |
| 2002/0046536 A1 * | 4/2002 | Hotta | 52/698 |
| 2005/0102944 A1 * | 5/2005 | Hikai | 52/511 |
| 2006/0272261 A1 * | 12/2006 | Ito | 52/586.1 |

FOREIGN PATENT DOCUMENTS

| | | |
|---|---|---|
| JP | 2003-129639 A | 5/2003 |
| JP | 2004-278084 A | 10/2004 |
| JP | 2004-293125 A | 10/2004 |
| JP | 2005-61135 A | 3/2005 |
| JP | 2005-146802 A | 6/2005 |
| JP | 2008-57132 A | 3/2008 |
| JP | 2008-261125 A | 10/2008 |
| JP | 3148121 U | 1/2009 |

* cited by examiner

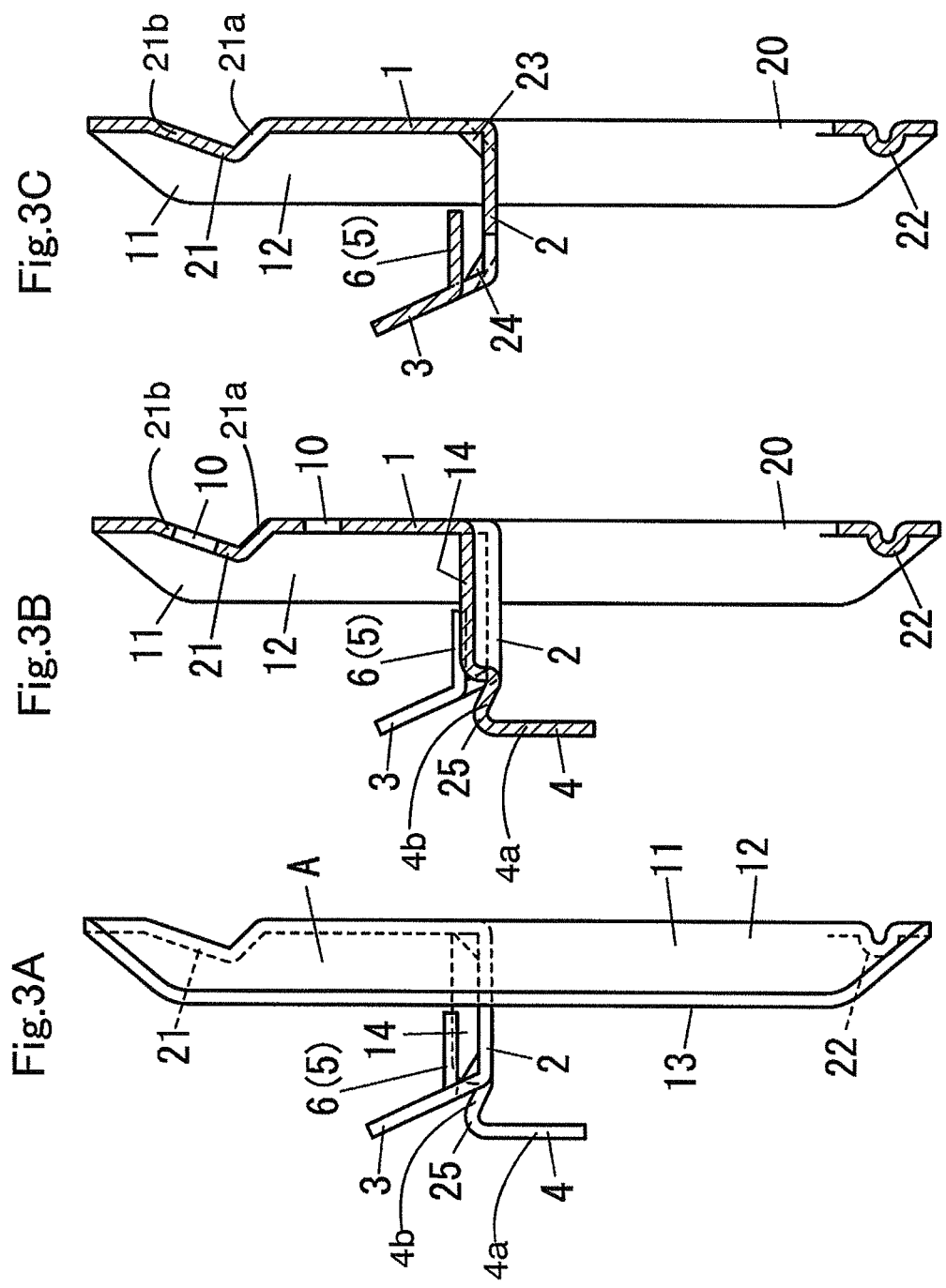

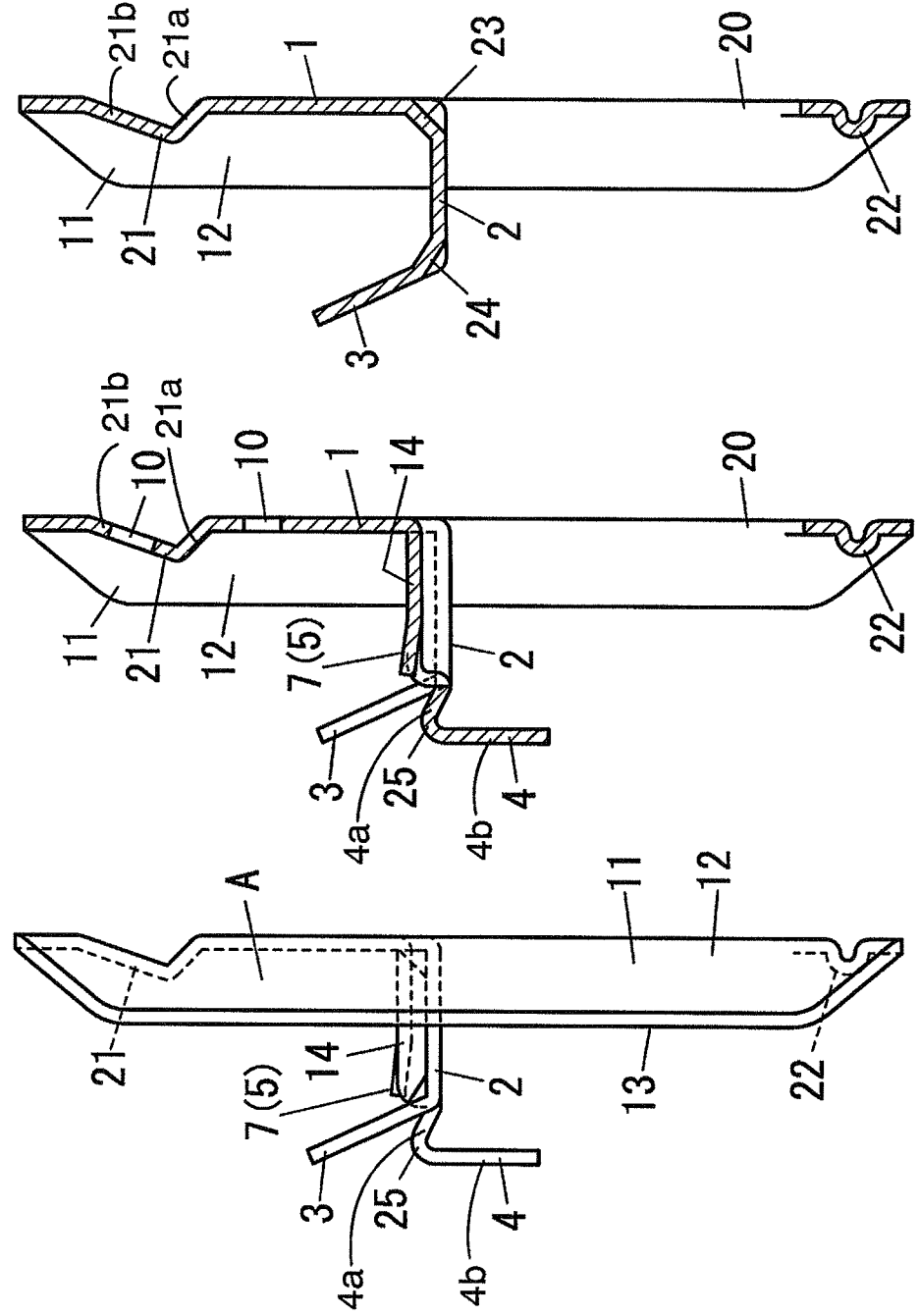

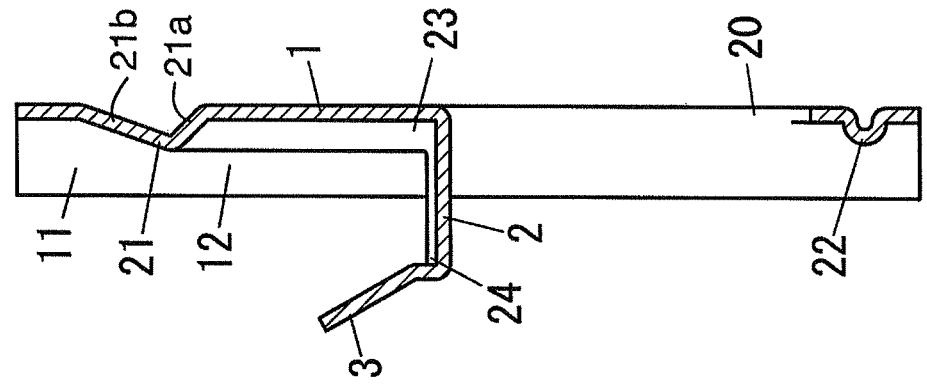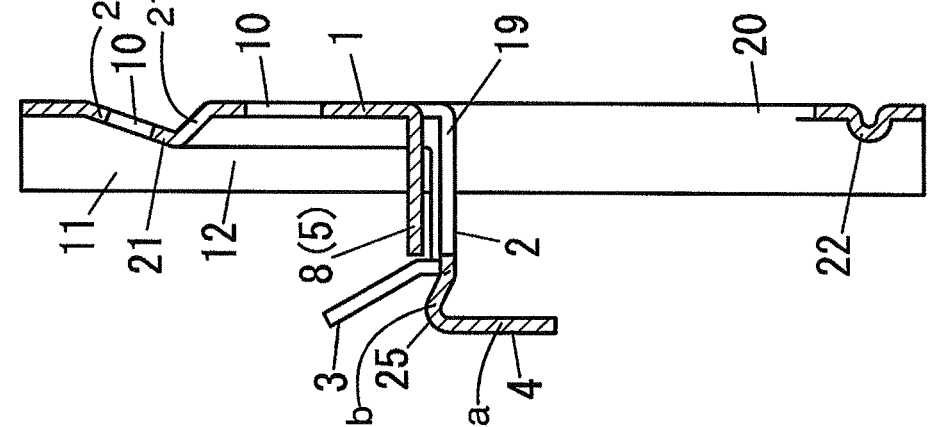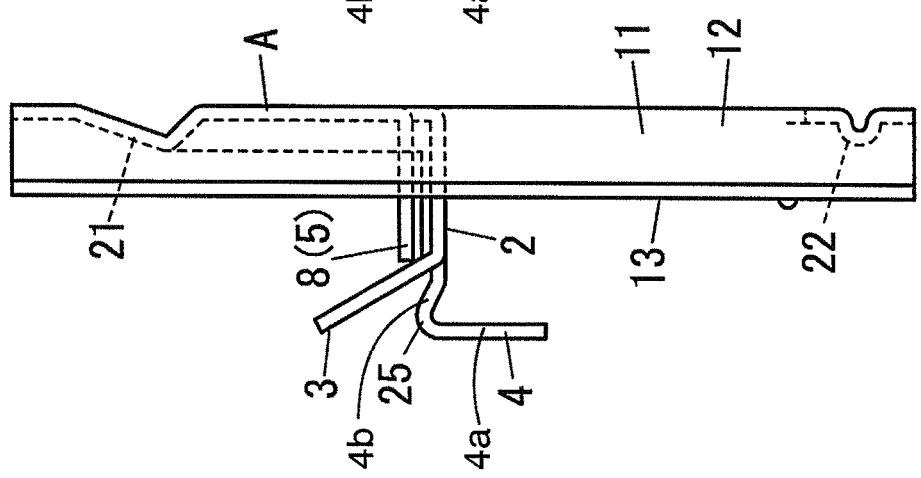

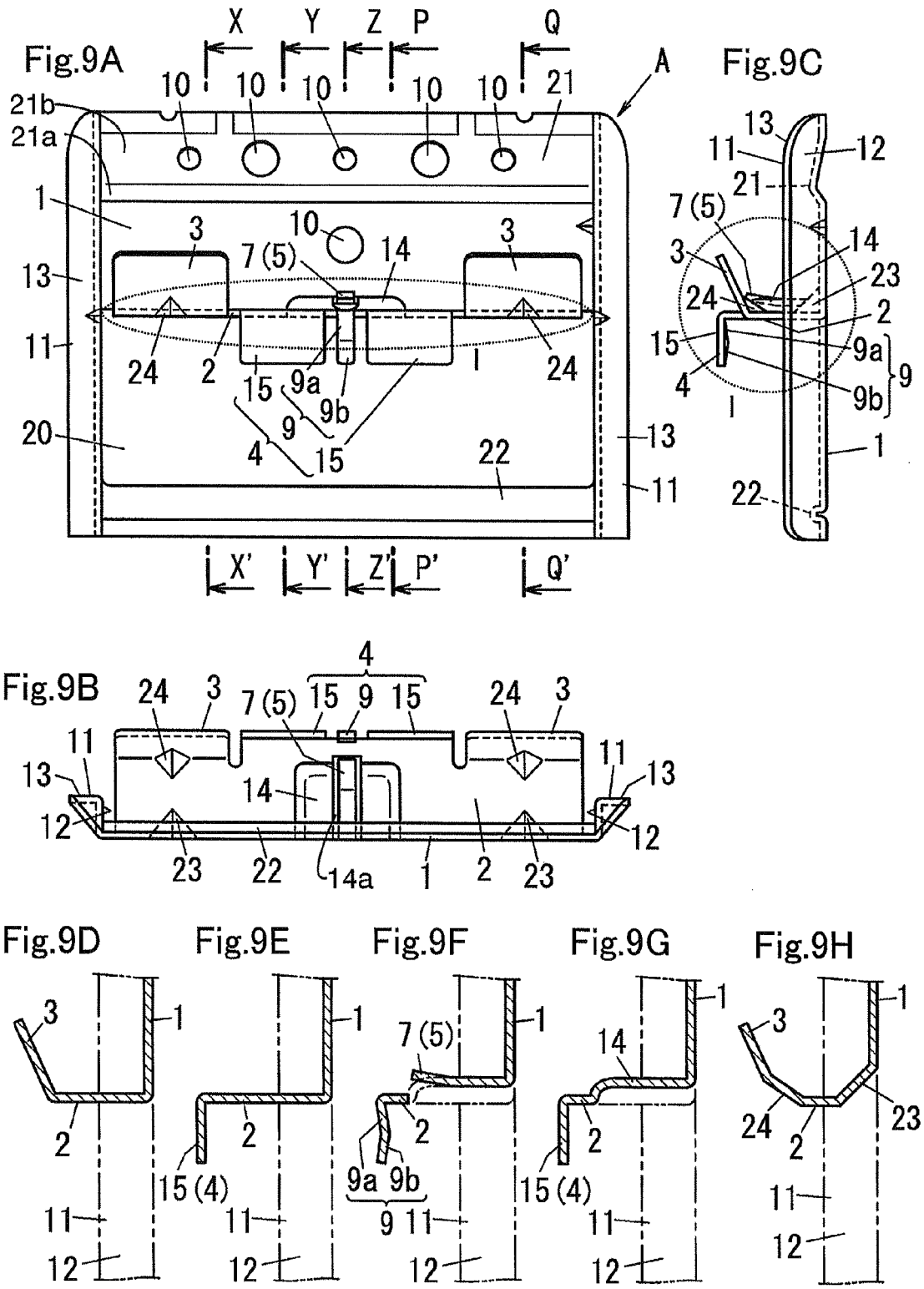

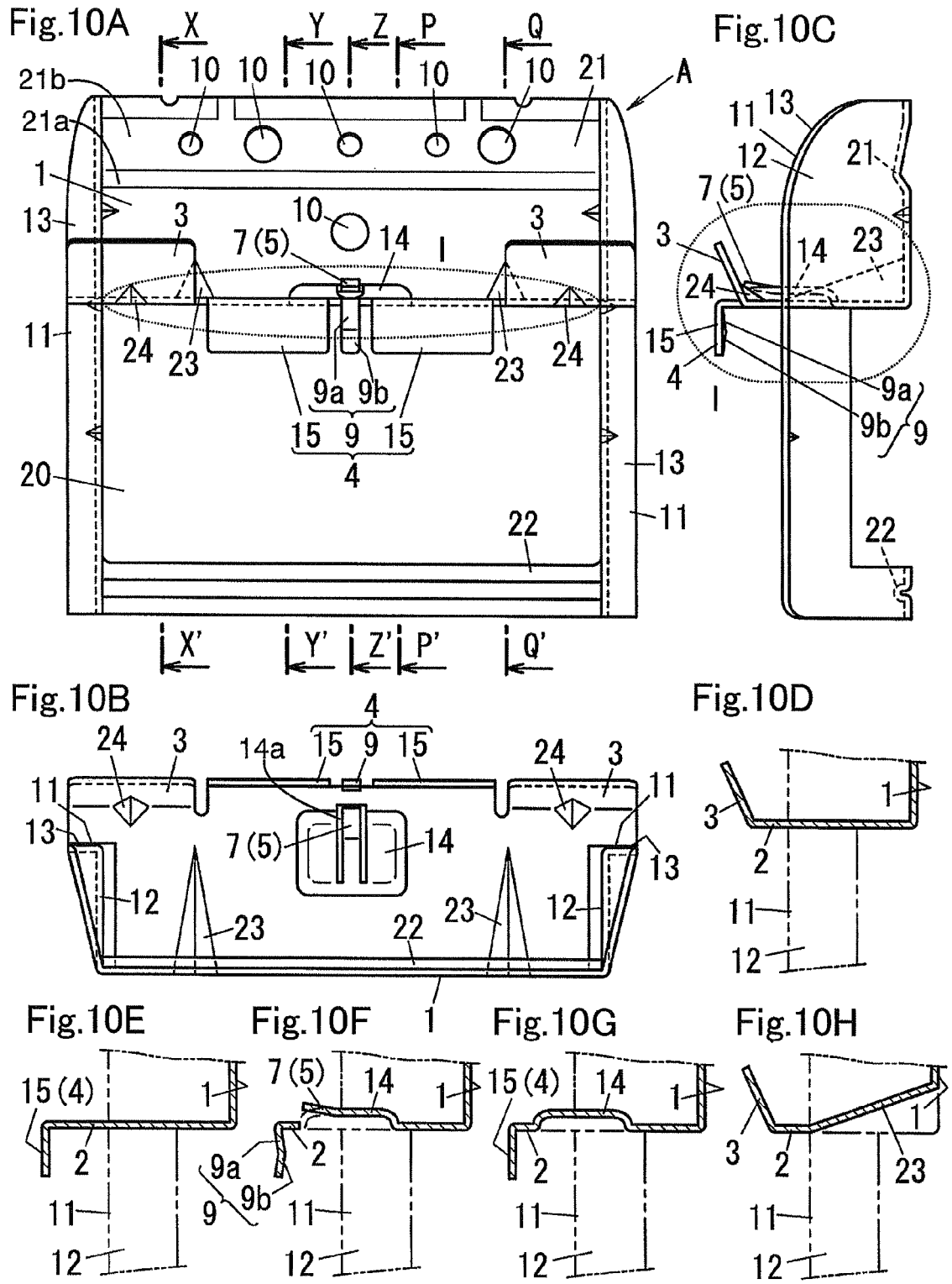

US 8,979,052 B2

EXTERNAL MATERIAL CLAMP AND EXTERNAL MATERIAL CLAMPING STRUCTURE

TECHNICAL FIELD

This invention relates to an external material clamp which is used for fixing the external material to a foundation of the wall of the building. In addition, this invention relates to an external material clamping structure for fixing the external materials to the foundation of the wall of the building with the external material clamp.

BACKGROUND ART

FIG. 12 shows the conventional external material clamping structure for fixing the external material 50 to the foundation 60 of the wall of the building with the external material clamp A. (Refer to Patent Literature 1 hereinafter explained) The external material clamp A comprises a fixed plate 1, a horizontal plate 2, an upper support plate 3, and a lower support plate 4. The horizontal plate 2 extends to a front direction from a center of the fixed plate 1. The upper support plate extends to an upper direction from a front end of the horizontal plate 2. The lower support plate 4 extends to the lower direction from the front end of the horizontal plate 2. The external material clamp A is fixed to the foundation 60 of the wall of the building with the fixation member 61 such as the nail and the screw under the condition where the fixation member 61 passes through the fixation hole 10 of the fixed plate 1. The external material 50 is inserted at its lower engagement portion 53 into the space between the upper support plate 3 and the fixed plate 1 of the external material clamp A, whereby the engagement between the lower engagement portion 53 of the external material 50 and the space is established. In addition, the external material 50 is inserted at its upper engagement portion 54 into the space between the lower support plate 4 and the fixed plate 1 of another external material clamp A, whereby the engagement between the upper engagement portion 54 of the external material and the space is established. According to repeating the above work to fix a plurality of the external materials in the vertical direction, the exterior wall of the building is formed. In addition, the upstanding member 11 is formed to project to a front direction from both lateral portion of the fixed plate 1. Consequently, the external material 50 is fixed to the foundation of the wall 60 to leave a ventilation space 62.

In the above external material clamping structure, the external material in an upper side is disposed such that the load of the external material in an upper side is applied to the upper surface of the external material in a lower side. That is, the lower end of the external material 50 is provided with a cover 51 which extends to the lower direction to cover the lower support plate 4 of the external material clamp A. The lower surface of the cover 51 is in a contact with the contact surface of an upper end of the external material in the lower side. The load of the external material of the upper side is applied to the contact portion of the external material 50 of the lower side.

However, in the external material clamping structure, there is a possibility of applying large load to the external material 50 of the lower side. Especially, when attaching a plurality of the external material 50 in the vertical direction, the external material 50 in a lower side of the wall receives the load of a plurality of the external materials 50. That is, the large load is applied to the external material 50 in the lower side of the wall. Applying the large load to the exterior wall 50 causes the problem such as the breakage and the deformation of the external material 50.

CITATION LIST

PATENT LITERATURE 1 Japanese patent application publication No. 2005-146802A

SUMMARY OF INVENTION

Problem to Solve

This invention is achieved in view of the above. An objective is to produce the external material clamp to prevent applying the large load to the external material in the lower side and to prevent the breakage and the deformation of the external material. In addition, an objective is to produce the external material clamping structure to prevent applying the large load to the external material in the lower side and to prevent the breakage and the deformation of the external material.

Solution to Problem

In order to solve the above problem, this invention discloses the external material clamp A which comprises a fixed plate 1, a horizontal plate 2, an upper support plate 3, and a lower support plate 4. The fixed plate is attached to and fixed to the foundation 60 of a wall of a building. The horizontal plate 2 is formed to project to the front direction from a center of the fixed plate 1. The upper support plate 3 extends to the upper direction from the front end of the horizontal plate 2. The upper support plate 3 is engaged with a lower end portion of the external material 50 arranged in an upper side of the external material clamp A, whereby the upper support plate 3 supports the external 50 in the upper side of the external material clamp A. The lower support plate 4 is formed to project to the lower direction from the front end of the horizontal plate 2. The lower support plate 4 is engaged with the upper end portion of another external material 50 in the lower side of the external material clamp A, whereby the lower support plate 4 supports the external material 50 in the lower side of the external material clamp 50.

The external material clamp preferably comprises the receiving plate 5. At least a part of the receiving plate 5 is located in an upper position of the horizontal plate 2. At least a part of the receiving plate 5 is in contact with the lower end portion of the external material 50 in the upper side to support at least a part of the load of the external material 50 in the upper side.

The receiving plate 5 is preferably realized by a receiving support plate 6. The receiving support plate 6 is formed by cutting out a part of the upper support plate 3 to project to the fixed plate 1.

The receiving plate 5 is preferably realized by a receiving horizontal plate 7 which is formed by cutting out a part of the horizontal plate 2.

The receiving plate 5 is preferably realized by the receiving fixed plate 8. The receiving fixed plate 8 is formed by cutting out a part of the fixed plate 1 to extend to the front direction.

It is preferred that the lower support plate 4 comprises a fixing support plate 9. The fixing support plate 9 is configured to contact with the front surface of the upper end portion of the external material in the lower side to hold the external material 50 between "the fixing support plate 9" and "the fixed plate 1".

In addition, the fixing support plate 9 preferably comprises a clipping plate 9a and a clipping tip 9b. The clipping plate 9a extends to the rear-lower direction from the horizontal plate. The clipping tip 9b extends to the front-lower direction from the lower end of the clipping plate 9a. Consequently, the lower support plate has a first cross section perpendicular to a lateral direction of the fixed plate. The first cross section has a V-shape.

In addition, the lower support plate preferably comprises a pair of the lower support plates. The lower support plates are arranged in the lateral direction of the fixed plate. The fixing support plate 9 is formed between the lower support plates.

The external material clamp A preferably comprises the fixation rib 21. The fixation rib 21 is provided to an upper end portion of the fixed plate 1. The fixation rib 21 is formed over a lateral direction of the fixed plate 1. The fixation rib 21 is a plate which is bent so as to project to the front direction.

The fixation rib 21 comprises a lower inclination plate and an upper inclination plate. The lower inclination plate extends to the front-upper direction from the upper end of the fixed plate 1. The upper inclination plate extends to the rear-upper direction from the upper end of the lower inclination plate. Consequently, the fixation rib 21 has a second cross section which is perpendicular to the lateral direction of the fixed plate 1. The second cross section has an L-shape. The upper inclination plate is formed with a fixation hole.

It is preferred that the external material clamp A comprises the fixation rib 22. The fixation rib 22 is provided to the lower end of the fixed plate 1. The fixation rib 22 is formed over a lateral direction of the fixed plate 1. The fixation rib 22 is formed by the plate which is bent to project to the front direction.

In addition, the upper support plate is preferably provided to both the lateral ends of the horizontal plate.

In addition, each the upper support plate preferably extends to the front-upper direction from the front end of the horizontal plate.

In addition, the lower support plate comprises a main plate and a sub plate. The sub plate extends to the front-upper direction from a front end of the lateral center of the horizontal plate. The main plate extends to the lower direction from the front end of the sub plate. Consequently, the lower support plate is cooperative with the front end of the horizontal plate to form the lower support rib. The lower support rib is formed over a lateral direction of the fixed plate. The lower support rib has a third cross section which is perpendicular to the lateral direction of the fixed plate. The third cross section has an L-shape.

In addition, the horizontal plate has a first length along a thickness direction of the fixed plate. The fixed plate is provided at its both lateral ends with upstanding members, respectively. Each the upstanding member extends in the vertical direction. Each the upstanding member has a second length along a thickness direction of the fixed plate. The second length is shorter than the first length.

It is preferred that each the upstanding member comprises an upstanding front plate and an upstanding side plate. The upstanding front plate extends to the front direction from the fixed plate. The upstanding side plate extends to the lateral direction from the front end of the upstanding front plate. The upstanding member is provided at its upper end portion with a smoothly curved surface. According to the smoothly curved surface, "the fixed plate", "the upstanding front plate", and "the upstanding side plate" are formed continuously and smoothly. The upstanding member is provided at its lower end with a smoothly curved surface. According to the smoothly curved surface, "the fixed plate", "the upstanding front plate" and "the upstanding side plate" are formed continuously and smoothly.

In addition, the horizontal plate 2 is preferably formed with a horizontal projection member. The horizontal projection member is formed to project to the upper direction. The horizontal projection member has an upper surface which is a flat surface. (The horizontal projection member has an upper surface which is approximately flat surface.)

Furthermore, the horizontal projection member is located in the lateral center of the horizontal plate.

In addition, the horizontal projection member preferably comprises the receiving horizontal plate. The receiving horizontal plate extends to the front-upper direction from the horizontal projection member. The receiving horizontal plate defines the receiving plate.

In addition, the horizontal projection member preferably formed with a slit having a U-shape. The slit 14a has a U-shaped cross section in the plane perpendicular to the vertical direction of the fixed plate. The receiving horizontal plate is defined by an area in an inside of the slit 14a having the U-shape. The receiving horizontal plate extends to the front-upper direction from the horizontal projection member.

In addition, it is preferred to employ the external material clamping structure for fixing the external materials to the foundation 60 of the wall of the building with the external material clamp A of the above configuration. The external material clamp A has the fixed plate 1 fixed to the foundation 60 of the wall. The external material 50 fixed to the lower side of the external material clamp A is engaged at its upper end with the lower support plate 4, whereby the external material fixed is supported by the external material clamp A. The external material 50 fixed to an upper side of the external material clamp A is engaged at its lower end with the upper support plate 3, whereby the external material 50 is supported by the external material clamp A. In addition, the external material clamp A is in contact at its lower end with both "the receiving plate 5" and "the external material fixed to the lower side". Consequently, the load of the external material 50 fixed to an upper side is shared by "the receiving plate 5" and "the external material 50 in the lower side".

Advantageous Effects of Invention

This invention discloses the external material clamp which comprises a receiving plate. At least a part of the receiving plate is located above the horizontal plate. Therefore, a part of the load of the external material in the upper side is supported by the receiving plate. Consequently, it is possible to fix a plurality of the external materials with prevention of applying the excess load to the external material in the lower side. Therefore, even if the large load is caused by fixing and arranging a plurality of the external materials in the vertical direction, it is possible to prevent the breakage and the deformation of the external material. That is, the load of the external material in the upper side is shared by "the external material in the lower side" and "the receiving plate of the external material clamp". Therefore, applying the excess load to the external material in the lower side is prevented. Further, the receiving plate receives a part of the load of the external material. Therefore, there is no possibility that only the receiving plate receives the excess load. So, it is possible to damage the foundation of the wall. Consequently, applying the excess load to the external material as well as applying the load to the foundation of the wall is prevented. Therefore, it is possible to prevent the breakage and the deformation of the external material.

Furthermore, the receiving plate is realized by the receiving support plate which is formed by cutting out the upper support plate. Therefore, additional work is not required, compared with a case where the receiving plate is formed by the separate components. Therefore, it is possible to easily form the receiving plate.

In addition, the receiving plate is realized by the receiving horizontal plate which is formed by cutting out a horizontal plate. Consequently, there is no need to perform additional work if the receiving plate is formed by the separate components. Therefore, it is possible to easily form the receiving plate.

In addition, the receiving plate is realized by the receiving fixed plate which is formed by cutting out a part of the fixed plate. Consequently, there is no need to perform additional work if the receiving plate is formed by the separate components. Therefore, it is possible to easily form the receiving plate.

In addition, the lower support plate is provided with the fixing support plate projected to the fixed plate from the lower support plate. Therefore, an upper end portion of the external material in the lower side is held and fixed between the fixing support plate and the fixed plate. Therefore, it is possible to support the external material with reducing the backlash.

Furthermore, the structure uses the external material clamp with the receiving plate. A load of the external material in the upper side is shared by "the receiving plate of the external material clamp" and "The external material in the lower side". Therefore, it is possible to prevent the excess load from being applied to the external material. Furthermore, the receiving plate receives a part of the load of the external material. Therefore, there is no possibility that the excess load is applied to only the receiving plate, whereby there is no possibility of damaging the foundation of the wall. Therefore, it is possible to prevent both "the applying the load to the foundation of the wall" and "applying excess load to the receiving plate". Therefore, it is possible to prevent the breakage and the deformation of the external material.

BRIEF DESCRIPTION OF DRAWINGS

FIG. 2 B shows a front view of the external material clamp of one embodiment.

FIG. 3 A shows a side view of the external material clamp of one embodiment.

FIG. 3 B shows a cross sectional view taken along a line of X-X' of the external material clamp of one embodiment.

FIG. 3 C shows a cross sectional view taken along a line of Y-Y' of the external material clamp of one embodiment.

FIG. 5 B shows a front view of the external material clamp of another embodiment.

FIG. 6 A shows a side view of the external material clamp of the above.

FIG. 6 B shows a cross sectional view taken along the line of X-X' in FIG. 5 B of the above.

FIG. 6 C shows a cross sectional view taken along the line of Y-Y' in FIG. 5 B of the above.

FIG. 7 B shows a bottom view of the external material clamp of another embodiment.

FIG. 8 A shows a side view of the external material clamp of another embodiment.

FIG. 8 B shows a cross sectional view taken along a line of X-X' of FIG. 7 A.

FIG. 8 C shows a cross sectional view taken along a line of Y-Y' of FIG. 7 A.

FIG. 9 A shows a front view of the external material clamp of another embodiment.

FIG. 9 B shows a bottom view of the external material clamp of another embodiment.

FIG. 9 C shows a side view of the external material clamp of another embodiment.

FIG. 9 D shows a cross sectional view taken along a line of X-X' in "|" of FIG. 9 A of another embodiment.

FIG. 9 E shows a cross sectional view taken along a line of Y-Y' in "|" of FIG. 9 A of another embodiment.

FIG. 9 F shows a cross sectional view taken along a line of Z-Z' in "|" of FIG. 9 A of another embodiment.

FIG. 9 G shows a cross sectional view taken along a line of P-P' in "|" of FIG. 9 A of another embodiment.

FIG. 9 H shows a cross sectional view taken along a line of Q-Q' in "|" of FIG. 9 A of another embodiment.

FIG. 10 A shows a front view of the external material clamp of another embodiment.

FIG. 10 B shows a bottom view of the external material clamp of another embodiment.

FIG. 10 C shows a side view of the external material clamp of another embodiment.

FIG. 10 D shows a cross sectional view taken along a line of X-X' in "|" of FIG. 10 A of another embodiment.

FIG. 10 E shows a cross sectional view taken along a line of Y-Y' in "|" of FIG. 10 A of another embodiment.

FIG. 10 F shows a cross sectional view taken along a line of Z-Z' in "|" of FIG. 10 A of another embodiment.

FIG. 10 G shows a cross sectional view taken along a line of P-P' in "|" of FIG. 10 A of another embodiment.

FIG. 10 H shows a cross sectional view taken along a line of Q-Q' in "|" of FIG. 10 A of another embodiment.

DESCRIPTION OF EMBODIMENTS

Hereinafter, the embodiments of this invention are explained.

Figure 1:
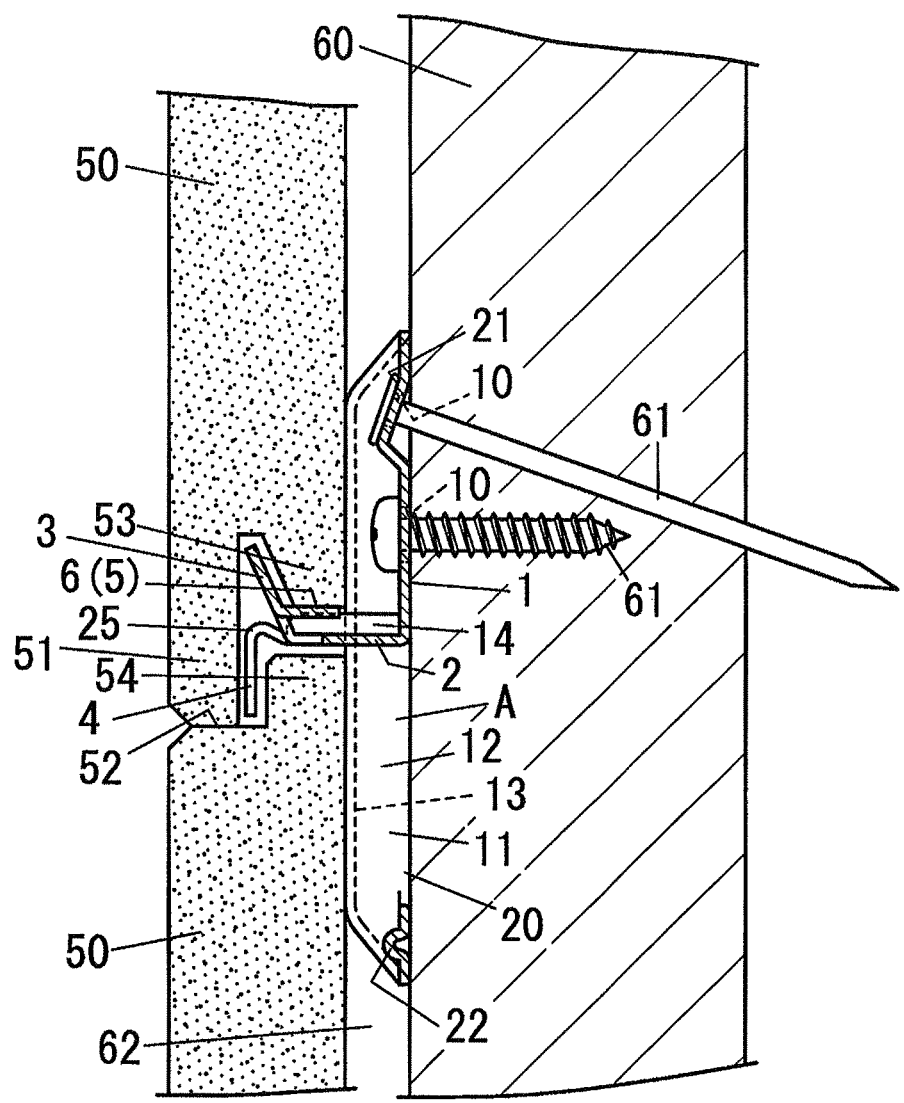
FIG. 1 shows a schematic cross sectional view of the external material clamping structure with the external material clamp of one embodiment.
Figure 2A:
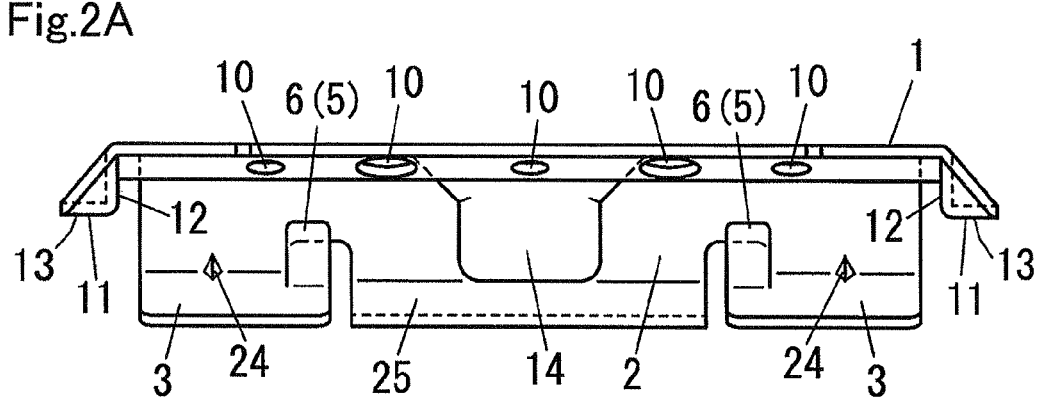
FIG. 2 A shows a planar view of the external material clamp of one embodiment.
Figure 2B:
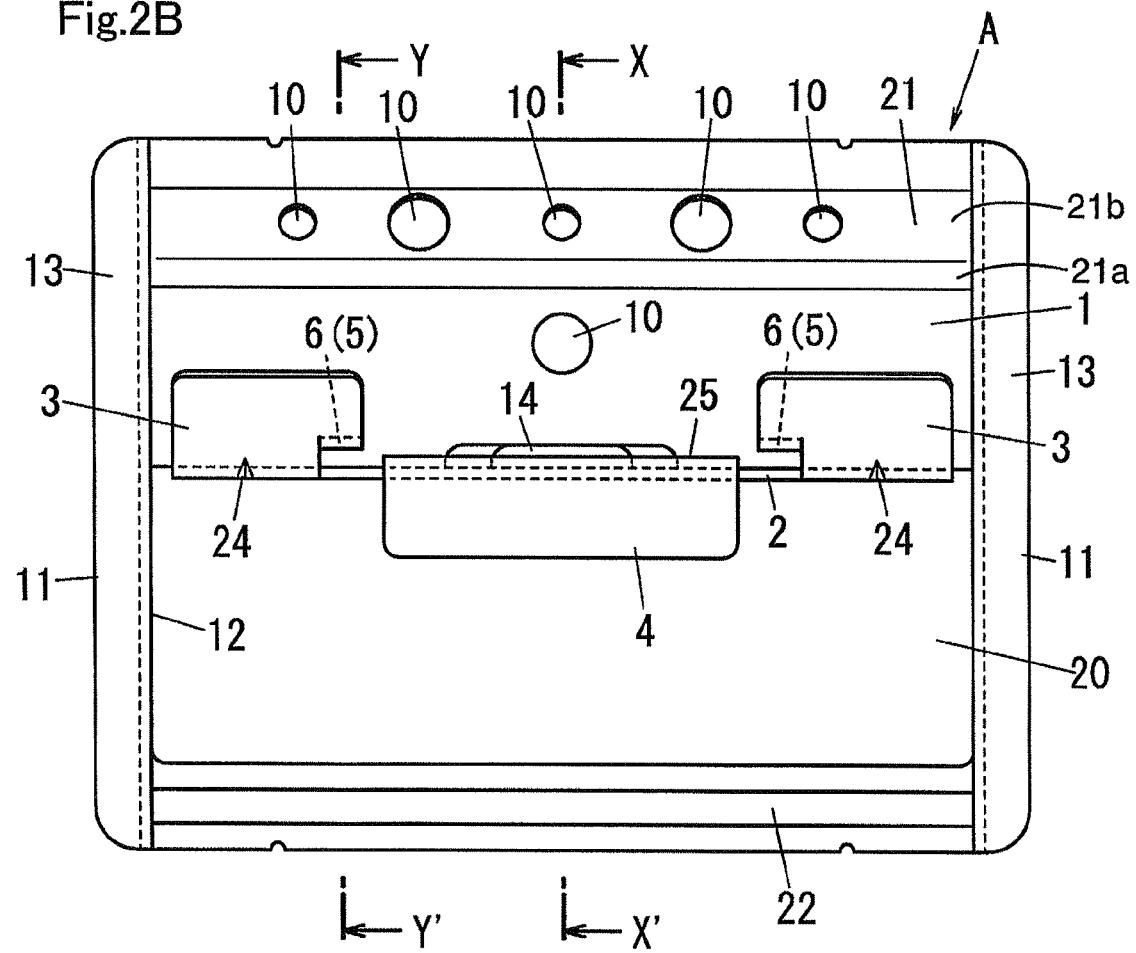

FIG. 2 and FIG. 3 each show one embodiment of the external material clamp A. FIG. 1 shows the external material clamping structure indicating the external material 50 fixed to the foundation 60 of the wall with the external material clamp A.

The external material clamp A comprises the fixed plate 1, the horizontal plate 2, the upper support plate 3, and the lower support plate 4. The horizontal plate 2 extends to a front direction from a center of the fixed plate 1. The upper support plate 3 extends to the upper direction from the front end of the horizontal plate 2. The lower support plate 4 extends to the lower direction from the front end of the horizontal plate 2. The external material clamp A is manufactured by way of, for example, "cutting the metal plate" and "bending the metal plate", arbitrarily. In the illustrated embodiment, the horizontal plate 2, the upper plate 3, and the lower plate 4 are formed by cutting out from a part of the fixed plate 1. Therefore, the fixed plate 1 is provided at its lower portion with an opening 20. In this invention, the definition of the center of the fixed plate 1 is "a portion of the fixed plate 1" which is other than the upper end of the fixed plate 1 and also other than the lower end of the fixed plate 1. The horizontal plate 2 may be formed in a position in an upper half of the fixed plate 1. Similarly, the horizontal plate may be formed in a position in a lower half of the fixed plate.

The fixed plate 1 is defined as a main body of the external material clamp A to be fixed to the foundation 60 of the wall of the building. The fixed plate 1 is provided with the fixation hole 10 which is used when the fixed plate 1 is fixed to the foundation 60 of the wall by the fixation member 61 such as nail and the screw. The fixed plate 1 is provided at its upper end with a fixation rib 21. The fixation rib 21 is provided for reinforce the fixed plate 1. The fixation rib 21 is formed over a lateral direction of the fixed plate 1. The fixation rib 21 is a bending portion of the fixed plate 1 to have an L-shaped cross section so as to be projected to the front direction. The fixed plate 1 is provided at its lower end with a fixation rib 22. The fixation rib 22 is provided for reinforce the fixed plate 1. The fixation rib 22 is formed over a lateral direction of the fixed plate 1. The fixation rib 22 has a C-shaped cross section so as to be projected to the front direction. In addition, both the lateral end of the fixed plate 1 is provided with projection members 11. Each the upstanding member 11 is projected to the front direction to have a projection length which is shorter than the projection length of the horizontal plate 2. The projection members 11 are provided for leaving the aeration space 62 between "the foundation 60 of the wall" and "The external material 50". Each the upstanding member 11 comprises a projection-front plate 12 and the projection-side plate 13. The projection-front plate 12 is formed to project to the front direction from the side end of the fixed plate 1 such that the projection-front plate 12 is approximately perpendicular to the side end of the fixed plate 1. The projection-side plate 13 is formed to project to a direction opposite of the fixed plate from the front end of the projection-front plate 12 such that the projection-side plate is approximately perpendicular to the projection-front plate 12. The upper end and the lower end of the upstanding member 11 are formed to have smoothly-curved surfaces which connect the fixed plate 1 with the projection-front plate 12 and the projection-side plate 13 smoothly.

The horizontal plate 2 is formed to project to the front direction from the fixed plate 1 to be approximately perpendicular to the fixed plate 1. The horizontal plate 2 is projected to have the projection length which is greater than the projection length of the upstanding member 11. Consequently, as shown in FIG. 1, the lower engagement member 53 of the external material 50 is inserted into and engaged with the space between the upstanding member 11 and the upper support plate 3. Further, the upper engagement member 54 of the external material 50 in the lower side is inserted into and engaged with the space between the upstanding member 11 and the lower support plate 4. Consequently, supporting and attaching the external materials 50 in the vertical direction is established. The horizontal plate 2 and the fixed plate 1 have a boundary portion therebetween. The boundary portion is provided at its both lateral ends with horizontal ribs 23, respectively. The horizontal ribs 23 are provided for reinforce the strength between the horizontal plate 2 and the fixed plate 1. As shown in FIG. 3 C, the horizontal rib 23 is formed to project upper-front direction. In addition, the horizontal plate 2 is provided at its center with a horizontal projection member 14. The horizontal projection member 14 is projected to the upper direction. The top of the horizontal projection member 14 has an approximately flat surface. The horizontal projection member 14 acts as the rib to reinforce the strength of the horizontal plate 2. The horizontal plate 2 is required to have a form such that the horizontal plate 2 engages with two external materials in the vertical direction. Therefore, the horizontal plate 2 may be inclined to extend in a direction such as obliquely-upper direction and obliquely-lower direction. That is to say, there is no need for the fixed plate 1 to be perpendicular to the fixed plate 1.

The upper support plate 3 in the embodiment of the figure has two upper support plates 3. The upper support plates 3 are formed to the both lateral ends of the horizontal plate 2, respectively. The upper support plate 3 projects from the front end of the horizontal plate to the upper direction with forwardly-inclination. Consequently, the lower engagement member 53 of the external material 50 is improved its insertability into the space between the fixed plate 1 and the upper support plate 3. The upper support plate 3 and the horizontal plate 2 are formed to have the boundary portion therebetween. The upper support rib 24 is provided for reinforce the strength between the upper support plate 3 and the horizontal plate 2. The boundary portion is provided with the upper support rib 24. The upper support rib 24 projects to the upper direction with backwardly-inclination.

The lower support plate 4 is formed to project to the lower direction from the center of the front end portion of the horizontal plate 2. The lower support plate 4 is projected approximately in parallel with the fixed plate 1. Further, the horizontal plate 2 is provided at its front end with a lower support rib 25 which is branched from the two upper support plates 3. The lower support rib 25 has a first section extending to the front direction with slight-upward-inclination and a second section which is bent to extend to the lower direction from the first section. The lower support rib 25 has an L-shaped cross section which is formed by the lower support plate 4 and the front end of the horizontal plate 2. The lower support rib 25 is provided to a boundary portion between the horizontal plate 2 and the lower support plate 4 over a lateral direction.

In addition, the external material clamp A of this invention further comprises the receiving plate 5 which is in abutting contact with the external material 50 attached to the upper side of the external material clamp A. FIG. 2 and FIG. 3 show the embodiment comprises the receiving plate 5. The receiving plate 5 is a receiving support plate 6 which is formed by cutting out a part of the upper support plate 3 to extend to the fixed plate 1. As explained above, if the receiving plate 5 is formed by the cutting out, there is no need to perform the additional complex work required when the receiving plate 5 is realized by the separate components of another receiving plate. So, it is possible to easily form the receiving plate 5.

The receiving support plate 6 is formed by cutting out the inside portion of the lower end of the two upper support plates 3 at the lower side of the receiving support plate 6. The receiving support plate 6 extends to the fixed plate 1 to be approximately perpendicular to the fixed plate 1. That is, the receiving support plate 6 is approximately in parallel with the horizontal plate 2. That is, the receiving support plate 6 has a cantilever structure which is coupled with the upper support plate 3 in the lateral direction. The receiving support plate 6 is formed to have a same position or an upper position of the upper surface of the horizontal projection member 14 of the horizontal plate 2. Therefore, as shown in FIG. 1, when the external material 50 is attached such that the lower engagement member 53 of the external material 50 in the upper side is inserted into the space between the upstanding member 11 and the upper support plate 3, the lower surface of the lower engagement member 53 is in contact with the receiving support plate 6.

Next, the method of fixing the external material 50 with the external material clamp A is explained.

The external material 50 having the rectangular shape having the long side in the lateral direction may be used. The external material 50 is provided at its upper end portion with the upper engagement member 54 which is formed over an entire length of the upper engagement member and which is projected to the upper direction. The upper engagement member 54 is formed near the back side of the external material 50. The external material 50 has the upper end surface which is defined as the contact surface 52. The external material 50 is provided at its lower end portion with the lower engagement member 53 and the cover member 51. The lower engagement member 53 is formed over an entire length and is projected to the lower direction. The cover member 51 is formed to project to the lower direction to have a projection size greater than that of the lower engagement member 53. The lower engagement member 53 is formed near the back side of the external material 50. The cover member 51 is formed near the front side of the external material 50. By using the external material 50 having the above explained shape, the external material 50 is fixed to the foundation 60 of the wall without directly fixing the external material to the foundation 60 of the wall by the fixation member. In addition, after fixing the external material clamp A, the external material clamp A is concealed so as not to expose to the outside. Therefore, it is possible to easily form the exterior of the building with good design.

Firstly, after aligning the position of the external material 50 in the lower side with respect to the external material clamp A, the external material clamp A is disposed to a predetermined position of the surface of the foundation 60 of the wall. Then, fixing the fixed plate on the foundation 60 of the wall with striking the fixation member 61 such as nail and the screw through the fixation hole 10 is made. The structure in the figure shows the state where the nail defined as the fixation member 61 is used for the fixation hole 10 of the upper side and where the screw defined as the fixation member 61 is used for the fixation hole 10 of the lower side. However, according to the building material of the foundation 60 of the wall, it is possible to use only one kind of the nail and the screw. In addition, after fixing the external material 50 in the lower side, the external material clamp A is moved to the lower direction from upside such that the upper engagement member 54 of the external material 50 is inserted into the space between the lower support plate 4 and the upstanding member 11. In this manner, the lower support plate 4 is fixed by the engagement of the lower support plate 4 with the upper engagement member.

Then, the external material 50 of the upper side is moved to the lower direction from upside such that the lower engagement member 53 is inserted into the space between the upper support plate 3 and the upstanding member 11 under a condition where the cover member 51 is located in front of the upper support plate 3 and the lower support plate 4. Consequently, the upper support plate 3 is engaged with the lower engagement member 53. Then, the external material 50 is inserted with pressure to the lower direction so the lower surface of the cover member 51 comes into contact with the contact surface 52 of the external material in the lower side. In addition, the external material 50 in the upper side applies its load to the external material 50 in the lower side. In this manner, the external material 50 in the upper side is mounted on the external material 50 in the lower side. Consequently, the cover member 51 conceals the lower support plate 4 in a position where the external material 50 in the upper side is mounted on the external material 50 in the lower side. So, an entire of the external material clamp A is concealed by the external materials 50 so as not to be exposed to the outside.

In addition, in the external material clamp A, when the external material 50 in the upper side is moved to the lower direction with pressure, the cover member 51 of the external material 50 in the upper side comes into contact with the contact surface 52 of the external material 50 in the lower side. In addition, at the same time or prior to the contact, the lower surface of the lower engagement member 53 of the external material in the upper side comes into contact with the receiving plate 5 (receiving support plate 6).

When "the cover member 51 of the external material 50 in the upper side comes into contact with the external material 50 in the lower side" and "the lower engagement member 53 of the external material 50 in the upper side comes into contact with the receiving plate 5", simultaneously, the external material in the upper side is supported by both "the contact surface 52" and "the receiving plate 5 of the external material clamp A". That is, the load of the external material 50 in the upper side is shared by "the external material 50 in the lower side" and "the receiving plate 5". Therefore, this configuration makes it possible to reduce the load applied to the external material 50 in the lower side.

However, in order to "make a contact between the external materials 50" and "make a contact between the external material 50 and the receiving plate 5" simultaneously, there is a need to accurately design "the size of the external material 50", "the size of the external material clamp A", and "the size for fixing the external material 50 with the external material clamp A". In addition, it is difficult to fix the external materials 50 to the wall with high accurate size.

In view of this, the external material clamp A preferably has the receiving plate 5 which is deformable in the vertical direction. With this configuration, the lower surface of the lower engagement member 53 of the external material 50 in the upper side comes into contact with the receiving plate 5, firstly. Consequently, the external material 50 in the upper side moves the receiving plate to the lower direction with pressure. According to the movement with pressure, the receiving plate 5 is made deformation with flexure to the lower direction such that the contact position between the receiving plate 5 and the external material 50 is moved to the lower direction. The deformation is ended when the cover member 51 of the external material 50 in the upper side comes into contact with the contact surface 52 of the external material in the lower side. Therefore, the external material 50 in the upper side is in contact with both "the contact surface of the external material 50 in the lower side" and "the receiving plate 5 of the external material clamp A". In addition, the external material 50 in the upper side is supported by two contact portions. Consequently, the load of the external material in the upper side is shared by "the external material 50 in the lower side" and "the receiving plate 5". This results in the reduction of the load applied to the external material in the lower side. Furthermore, in the embodiment of the figure, the receiving plate 5 is realized by the receiving support plate 6 of the upper support plate 3. Therefore, the receiving support plate 6 with deformation is configured to provide the lower engagement member 53 of the external material 50 with the bias which pushes the lower engagement member 53 of the external material 50 to a rear surface side. Therefore, it is possible to fix the external material 50 with prevention of the backlash.

In addition, the receiving plate 5 is preferably formed to move into the lower end portion of the external material 50. In this case, the lower surface of the lower engagement member 53 of the external material 50 in the upper side comes into contact with the receiving plate 5, firstly. Then, the external material 50 moves to the lower direction with the pressure. Consequently, the receiving plate 5 is moved into the external material 50 from the lower surface of the lower engagement member 53 of the external material 50. The movement into the external material 50 is ended when the cover member 51 of the external material in the upper side is in contact with the external material 50 in the lower side. Therefore, the external material 50 in the upper side is in contact with both "the contact surface 52 of the external material 50 in the lower side" and "the receiving plate 5 of the external material clamp A". That is, the external material 50 in the upper side is supported by the two contact portions of "the external material 50 in the lower side" and "the receiving plate 5 of the external material clamp A". The external material 50 in the upper side is supported by "the external material 50 in the lower side" and "the receiving plate 5" such that the load of the external material 50 is shared by "the external material 50 in the lower side" and "the receiving plate 5". Therefore, it is possible to reduce the load applied to the external material 50 in the lower side.

As explained above in each case, when the external material 50 has a fixed condition, the external material 50 in the upper side is mounted in such a manner that "the lower surface of the cover member 51 of the external material 50 in the upper side" is in contact with "the contact surface of the external material 50 in the lower side". In addition, the lower surface of the lower engagement member 53 is in contact with the receiving plate 5. Consequently, the load of the external material in the upper side is shared by "the external material 50 in the lower side" and "the receiving support plate 6 of the external material clamp A". Therefore, applying the excess load to the external material 50 is prevented. Therefore, this configuration makes it possible to prevent the breakage and the deformation of the external material.

It is noted that the external material clamp A may be formed to have the member for receiving the external material 50 in an upper position of the horizontal plate. (The member for receiving the external material 50 is defined as the receiving stop member.) In this case, the external material 50 in the upper side is not in contact with the external material 50 in the lower side. Therefore, the structure of supporting all the load of the external material 50 by the receiving stop member is established. However in this case, the surfaces of them are formed with the gap. Therefore, the appearance property is decreased. In addition, the external material 50 applies all of the loads to the external material clamp A via the receiving stop member. Therefore, the external material 50 is supported its load by the fixation member 61 which fixes the external material clamp A to the foundation 60 of the wall. When all the loads of the external material 50 are applied to the external material clamp A, the fixation member 61 needs to support all the load directed to the lower direction. In this case, the external material clamp receives the load of the external material in each portion. Therefore, this configuration makes it possible to prevent the external material from being displaced.

However, according to the external material clamping structure of the above, it is only need to support a part of the load of the external material 50 by the receiving plate 5. In other words, the external material clamp A does not have to support all the loads of the external material. Therefore, it is possible to establish the fixation of the external material without a damage of the foundation 60 of the wall.

Figure 4:
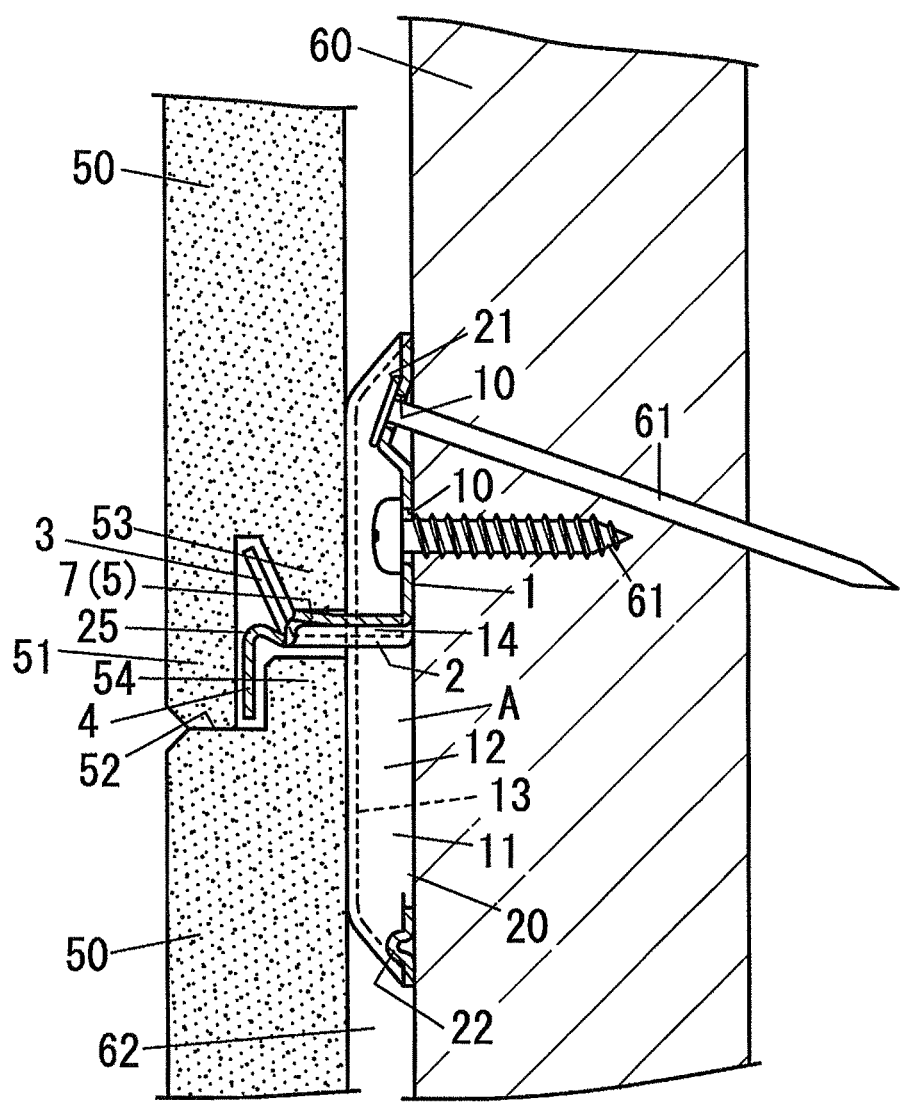
FIG. 4 shows a schematic cross sectional view of the external material clamping structure with the external material clamp of another embodiment.
Figure 5A:
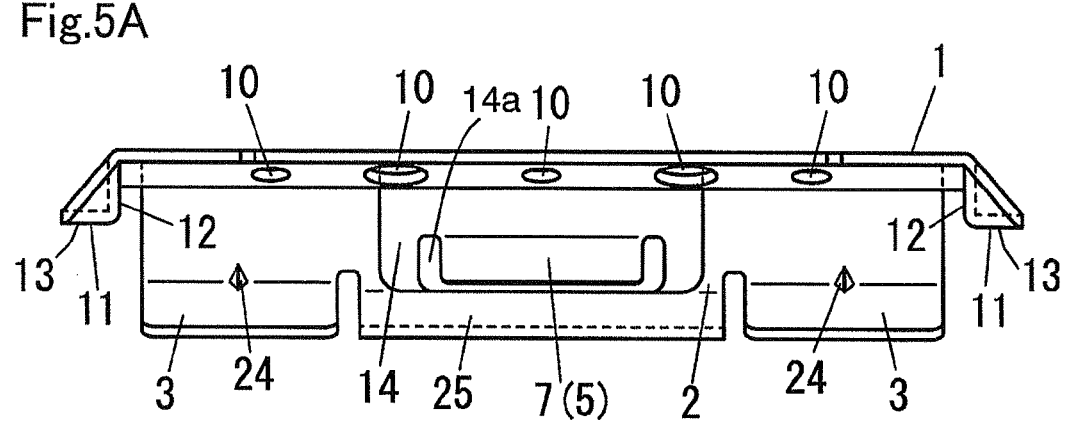
FIG. 5 A shows a planar view of the external material clamp of another embodiment.
Figure 5B:
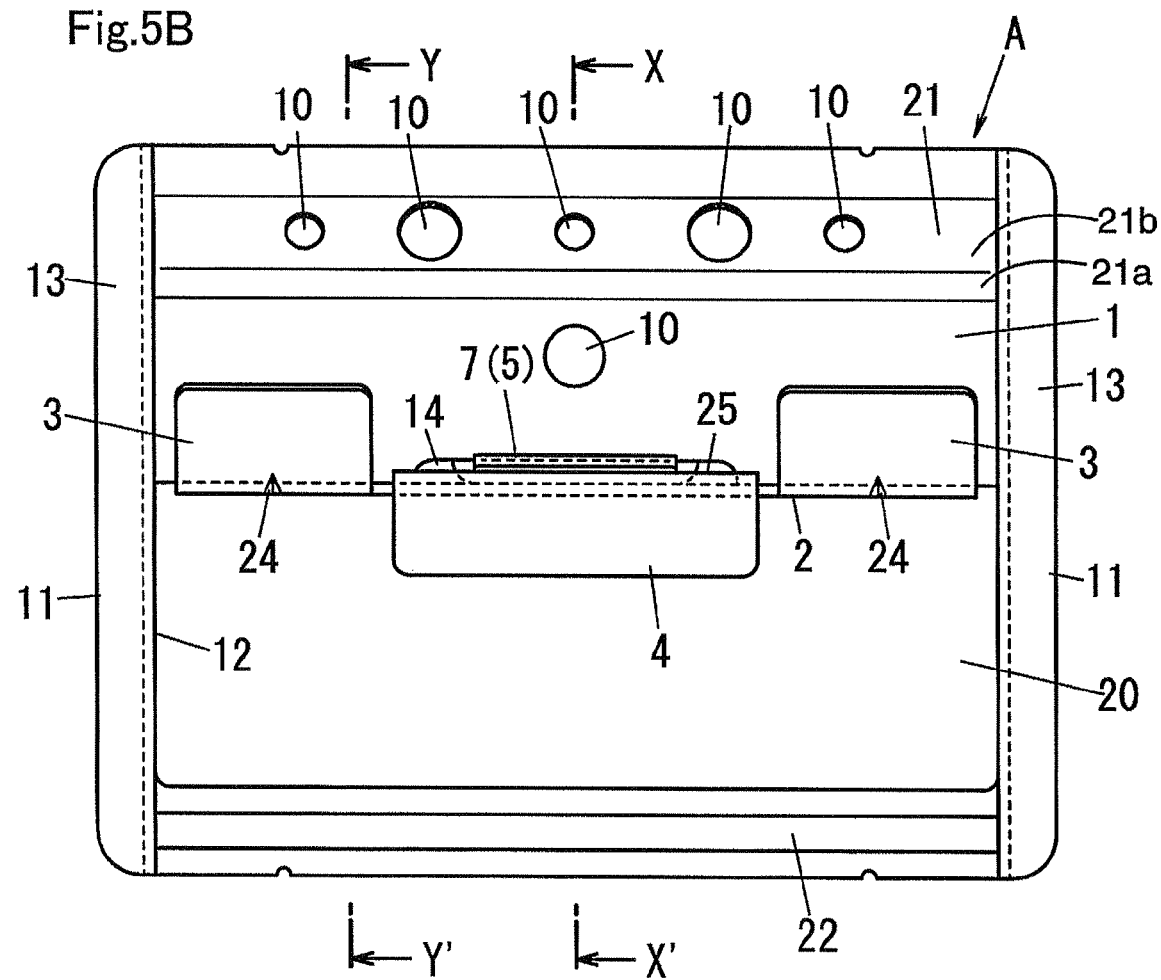

FIG. 5 and FIG. 6 show embodiments of the external material clamp A of this invention. FIG. 4 shows the example of the external material clamping structure indicating the external material 50 fixed to the foundation 60 of the wall with the external material clamp A. In the figures, the configurations in common with the configurations of FIG. 1 to FIG. 3 are symbolized by the same reference numerals, whereby the explanations of them are omitted.

In this embodiment, the receiving plate 5 is realized by the receiving horizontal plate 7 which is formed by cutting out a part of the horizontal plate 2. The receiving plate 5 extends in the upper direction. If the receiving plate 5 is formed by cutting out a part of the horizontal plate, there is no need to make a complex work, compared with a case where the receiving plate 5 is formed as a separate component. Therefore, it is possible to form the receiving plate 5, easily.

The receiving horizontal plate 7 is formed by cutting out a part of the front end of the horizontal projection member 14 of the horizontal plate 2. A part of the horizontal projection member 14 extends in the front direction so as to extend to the front-upper direction. That is, the receiving horizontal plate 7 has a cantilever structure which is coupled with the horizontal plate 2 in the lateral direction. A tip of the receiving horizontal plate 7 is formed to be located above the horizontal projection member 14. Therefore, as shown in FIG. 4, when the external material 50 is attached such that the external material 50 in the upper side is inserted its lower engagement member 53 into the space between the upstanding member 11 and the upper support plate 3, the lower surface of the lower engagement member 53 comes into contact with the receiving horizontal plate 7.

In this embodiment, similar to the above explained embodiment, the external material 50 in the upper side and the external material 50 in the lower side are fixed under a condition where the contact surface 52 of the external material 50 in the lower side is in contact with the receiving horizontal plate 7 of the external material clamp A. Therefore, the receiving horizontal plate 7 supports at least a part of the load of the external material 50. Consequently, applying too much load to the external material in the lower side is prevented. Furthermore, preventing the breakage and the deformation of the external material 50 is made. Further, the receiving horizontal plate 7 is provided to the horizontal projection member 14. Even if the receiving horizontal plate 7 receives the load, the horizontal projection member 14 acts as the rib to increase the strength of the horizontal plate 2. Therefore, the stress of the horizontal projection member 14 bears the load applied to the receiving horizontal plate 7. Therefore, this configuration makes it possible to support the external material 50 surely.

Figure 7A:
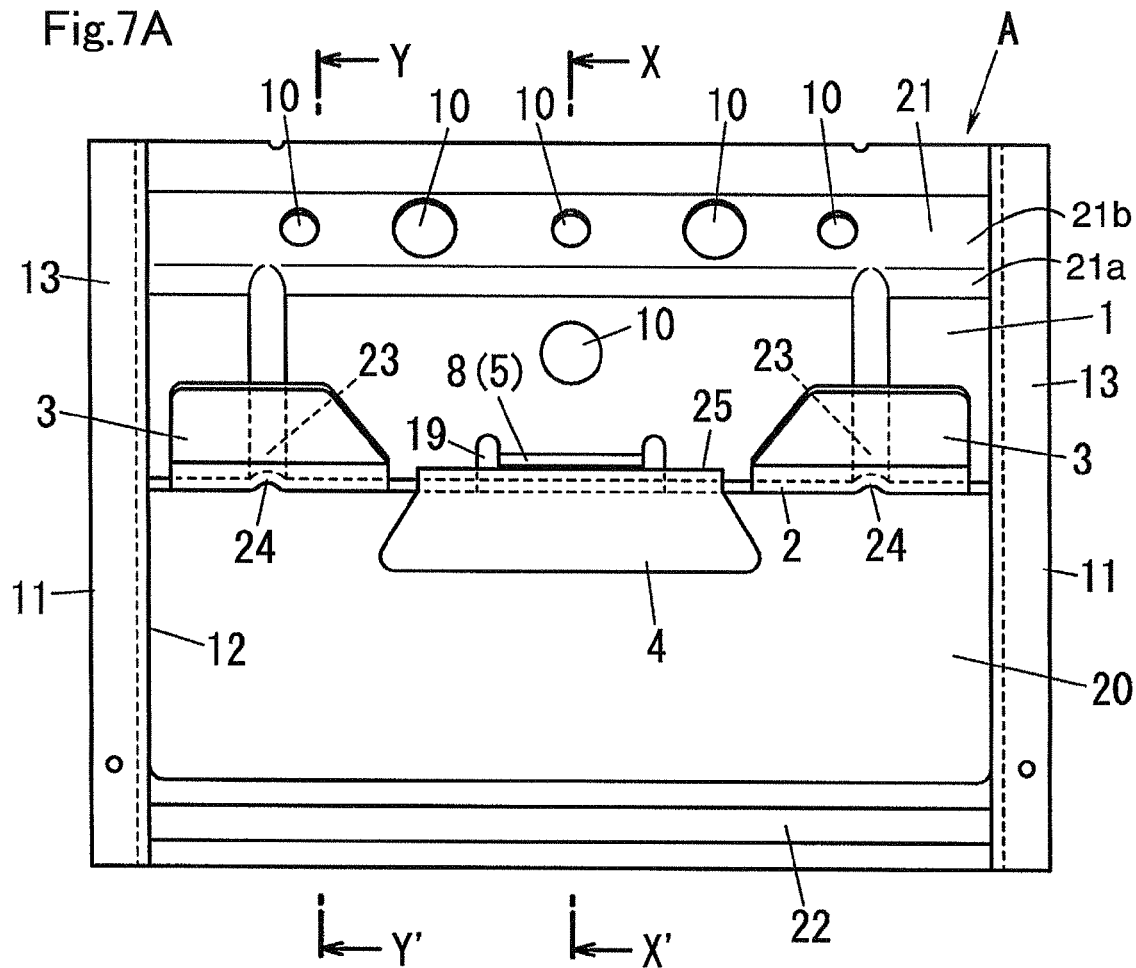
FIG. 7 A shows a front view of the external material clamp of another embodiment.
Figure 7B:
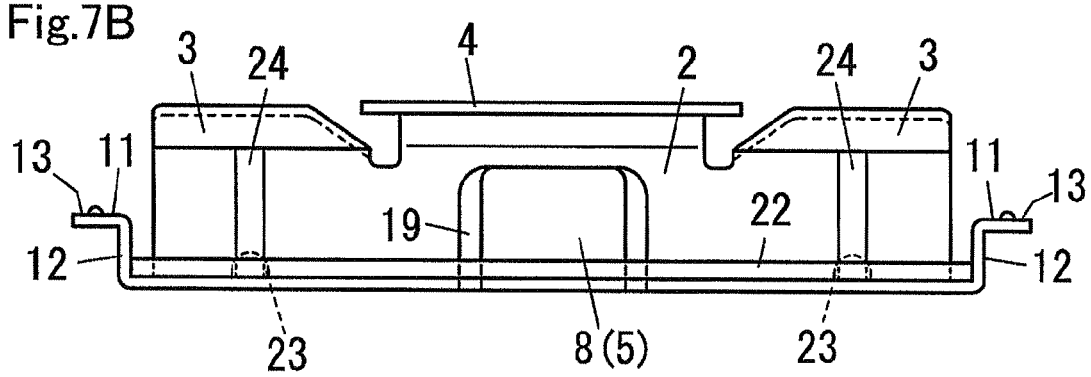

FIG. 7 and FIG. 8 show another embodiment of the external material clamp A of this invention. In the figure, the configurations in common with the configuration indicated in FIG. 1 to FIG. 3 are symbolized by the same reference signs, whereby explanations of them are omitted.

In this embodiment, the receiving plate 5 is realized by the receiving fix plate 8. The receiving fix plate is formed by cutting out a part of the fixed plate 1 to extend to the front direction. If the receiving plate 5 is formed by cutting of in this manner, there is no need to perform an additional complex work when the receiving plate 5 is realized by the separate component. Therefore, it is possible to easily form the receiving plate 5.

The receiving fix plate 8 is formed to have a boundary portion of the receiving fix plate 8 and the fixed plate 1. The boundary of the receiving fix plate 8 and the fixed plate 1 is defined by a position above the boundary portion of the fixed plate 1 and the horizontal plate 2. The receiving fix plate 8 is formed by the cutting tip which is formed by cutting the horizontal plate 2 to its center in the longitudinal direction and which is cut out to extend in the lateral direction within the horizontal plate 2. The receiving fix plate 8 extends to the front direction such that the receiving fix plate 8 is approximately perpendicular to the fixed plate 1. (The receiving fix plate 8 is approximately in parallel with the horizontal plate 2.) That is, the receiving fix plate 8 has a cantilever structure which is coupled to the fixed plate 1 in the lateral direction. Therefore, the receiving fix plate 8 is located above the horizontal plate 2. So, if the external material 50 is attached under a condition where the external material 50 in the upper side is inserted its lower engagement member 53 into the space between the upstanding member 11 and the upper support plate 3, the lower surface of the lower engagement member 53 is in contact with the receiving fix plate 8.

In addition, in this embodiment, the receiving fix plate 8 further includes a part of the horizontal plate 2 by cutting out a part of the horizontal plate 2. Therefore, the boundary portion of the horizontal plate 2 and the fixed plate 1 is provided at its center with an opening 19. Therefore, in order to improve the strength, the horizontal rib 23 extends to the front direction to be coupled to the upper support rib 24. In addition, the horizontal rib 23 also extends in the upper direction to be coupled to the fixation rib 21.

Furthermore, as the lower support plate 4 extends to the lower direction, the lower support plate 4 is projected to the lower direction such that "the width of the lower support plate 4 gradually increases and both sides extends to the outwardly". In contrast, the upper support plate is cut at its inside portion to oblique-upper direction to have a width which gradually becomes small toward the upper direction.

In this embodiment, similar to the above embodiment, the external material 50 in the upper side is fixed under a condition where the external material 50 in the upper side is in contact with both "the contact surface 52 of the external material 50 of the lower side" and "the receiving fix plate 8 of the external material clamp A". Therefore, the receiving fix plate 8 receives at least a part of the load of the external material. So, applying the excess load to the external material in the lower side is prevented. Consequently, it is possible to prevent the breakage and the deformation of the external material 50.

Figure 11:
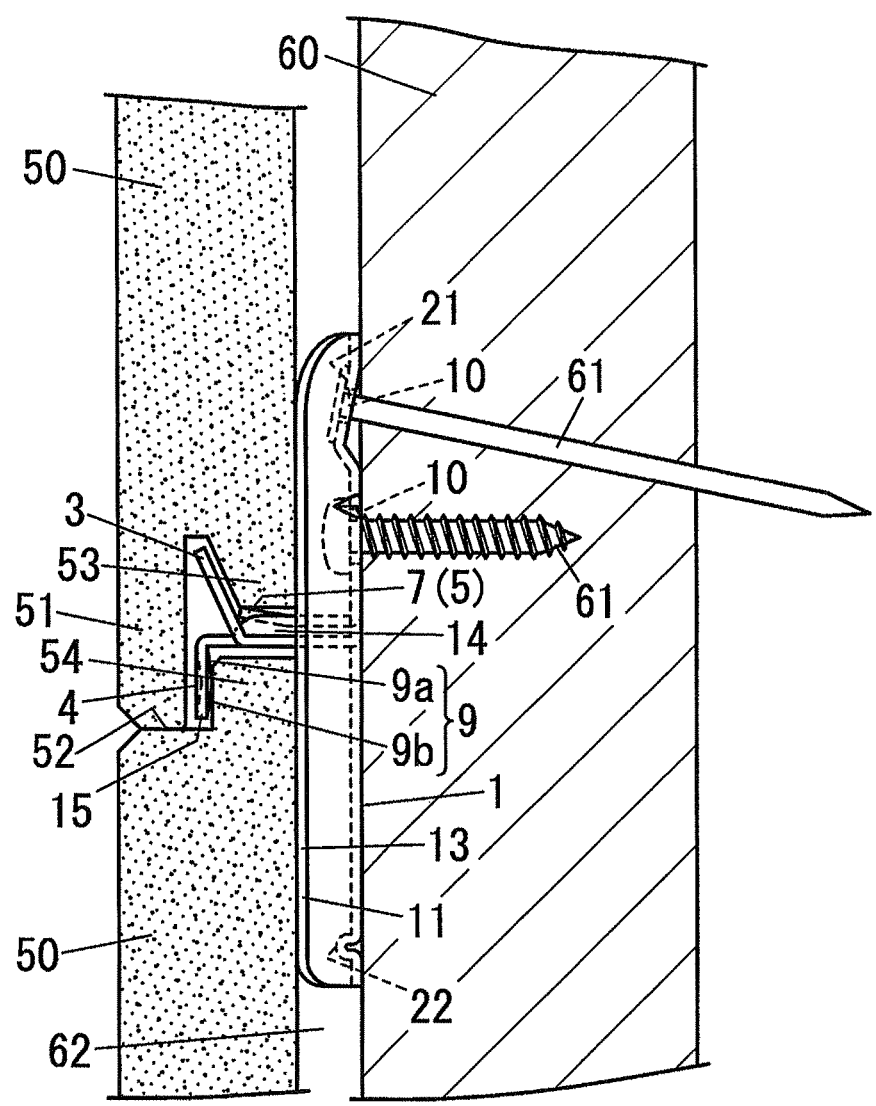
FIG. 11 shows a schematic cross sectional view of the external material clamping structure with the external material clamp of another embodiment.
Figure 12:
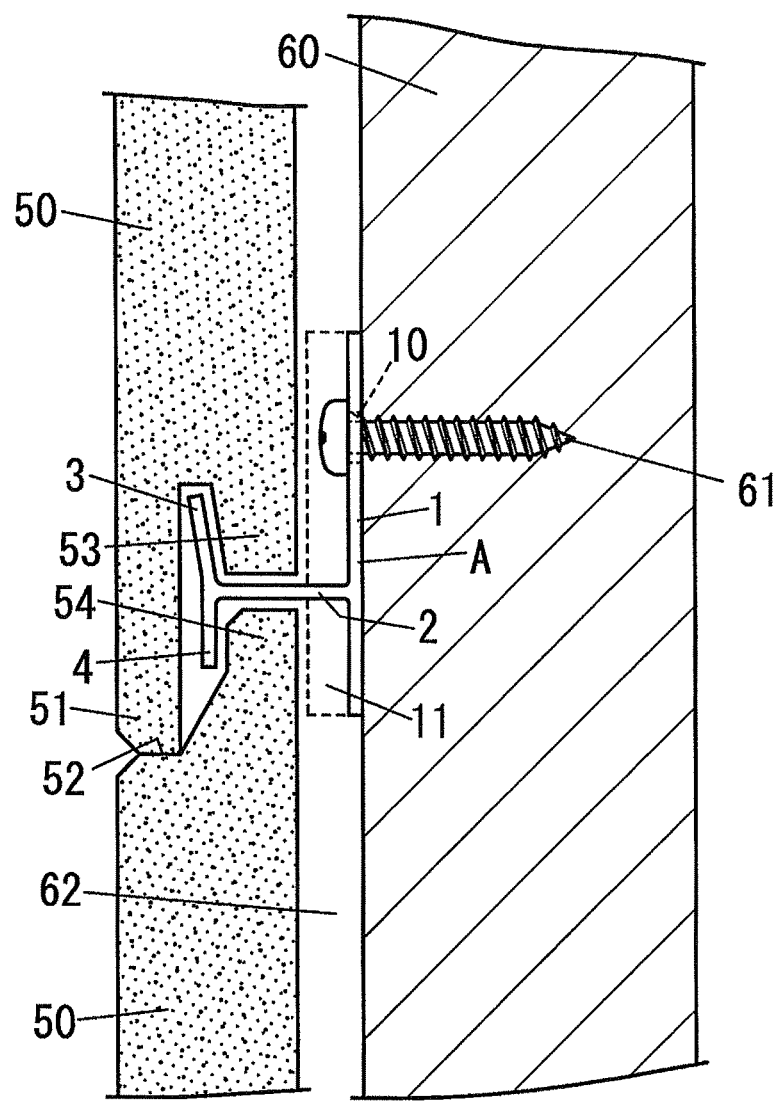
FIG. 12 shows a schematic cross sectional view of the conventional external material clamp and the conventional external material clamping structure.

FIG. 9 and FIG. 10 shows an example of the external material clamp A of this invention. FIG. 9 shows the embodiment having the clamp of thin type. For example, the upstanding member 11 has the projection length of 5 millimeters. Consequently, the clamp of the thin type is configured to leave the small-width aeration space 62. In contrast, FIG. 10 shows the embodiment having the thick clamp. For example, the upstanding member 11 has the projection length of 15 millimeters. Consequently, the clamp of the thick type is configured to leave the large-width aeration space 62. In addition, FIG. 11 shows the example of the external material clamping structure with the external material clamp A shown by FIG. 9.

In this embodiment, similar to FIG. 5 and FIG. 6, the receiving plate 5 is defined by the receiving horizontal plate 7. The receiving horizontal plate 7 is provided to the horizontal projection member 14 of the horizontal plate 2. It is noted that the components in common with the components of the previous embodiment are symbolized by the same reference signs, whereby the explanations of them are omitted. In addition, in each figures, "the thickness of the metal plate" and "the metal plate in far position of the cross section" are indicated by the broken line.

In this embodiment, the lower support plate 4 comprises two lower support plates 15 and the fixing support plate 9. The lower support plates 15, 15 are provided to the both side, respectively. The fixing support plate 9 is provided to a center. The lower support plate 15 extends to the lower direction such that the lower support plate 15 is approximately perpendicular to the horizontal plate 2. (The lower support plate 15 extends to the lower direction such that the lower support plate 15 is approximately in parallel with the fixed plate 1.) In contrast, the fixing support plate 9 is provided to the lower support plate 4 such that the fixing support plate 9 projects to the fixed plate 1. In the figure, the fixing support plate 9 comprises the clipping plate 9a and the clipping tip 9b. The clipping plate 9a extends to the lower direction such that the clipping plate 9a extends to the fixed plate 1. The clipping tip 9b extends to the oblique front-lower direction from the clipping plate 9a. Consequently, the fixing support plate has a V-shaped cross section. The fixing support plate 9 is formed by cutting out a part of the lower support plate 4. Therefore, it is possible to easily form the fixing support plate without employing the separate components.

In addition, the fixing support plate 9 has a small width in the lateral direction. Therefore, the fixing support plate 9 is easily deformed in the front-back direction, compared with the case where the fixing plate 9 is formed by the lower support plate 4 entire of which is bent to project to the fixed plate 1. So, the external material 50 is easily inserted into the space formed by the fixing support plate 9. In addition, when the external material 50 is inserted thereto, the fixing support plate 9 surely clips the external material 50 with the elastic force. Consequently, the external material is surely fixed.

In this embodiment, similar to the above embodiment, the external materials 50 are fixed such that the external material 50 in the upper side is in contact with both "the contact surface 52 of the external material 50 in the lower side" and "the receiving horizontal plate 7 of the external material clamp A". Therefore, at least a part of the load of the external material 50 is hanged to the receiving horizontal plate 7. Consequently, it is possible to apply excess load to the external material in the lower side. That is, this configuration makes it possible to prevent the breakage and the deformation of the external material 50.

Further, when the external material 50 is fixed to the lower side, as shown in FIG. 11, the external material 50 in the lower side is in contact at its front surface of the upper engagement member 54 with the fixing support plate 9. Consequently, the external material 50 in the lower side is interposed between the upstanding member 11 and the fixing support plate 9 so as to be fixed. Therefore, it is possible to fix the external material 50 in the lower side with prevention of the backlash.

As explained above, the receiving plate 5 of the external material clamp A is exemplified by the receiving support plate 6, the receiving horizontal plate 7, and the receiving fix plate 8 shown in the figures. However, the receiving plate 5 of this invention is not limited its position thereto. For example, it is possible to cut out a part of the projection side plate 13 of the upstanding member 11 to extend to the front direction. In this case, a part of the projection side plate 13 extends to the front direction is defined as the receiving plate 5. (The receiving plate 5 is, in other words, the receiving projection plate.)

Summarizing the above, this invention discloses the external material clamp A which is used for fixing the upper-side external material 50 and the lower-side external material 50 arranged in the vertical direction of the wall of the building wall to fix the upper-side external material 50 and the lower-side external material 50 to the wall of the building. The external material clamp A has a vertical direction along the vertical direction of the wall, a lateral direction along a lateral direction of the wall, and a front-back direction perpendicular to the wall. The external material A comprises the fixed plate 1, the horizontal plate 2, the upper support plate 3, and the lower support plate 4. The fixed plate 1 is mounted on the foundation of the wall 60 of the building to be fixed to the foundation of the wall. The horizontal plate 2 is projected to the front direction from a center in the vertical direction of the fixed plate 1. The upper support plate 3 is formed to project to the upper direction from the front end of the horizontal plate 2. The upper support plate 3 is configured to engage with the lower end portion of the upper-side external material 50 which is arranged in the upper side to support the upper-side external material 50. The lower support plate 4 is formed to project to the lower direction from the front end of the horizontal plate 2. The lower support plate 4 is configured to engage with the upper end portion of the lower-side external material which is arranged in the lower side to support the lower-side external material. The external material clamp A further comprises the receiving plate 5. At least a part of the receiving plate 5 is located in an upper position of the horizontal plate 2. The receiving plate 5 is configured to contact with the lower end portion of the upper-side external material 50 which is arranged in the upper side, whereby the receiving plate 5 supports at least a part of load of the upper-side external material 50 in the upper side.

With this configuration, it is possible to fix the upper-side external material 50 to the foundation 60 of the wall with prevention of applying excess load to the lower-side external material 50. Therefore, even in the case where a large load is caused by mounting a plurality of the external material in the vertical direction, it is possible to prevent the breakage and the deformation of the external material 50. That is, the load of the external material 50 in the upper side is shared by "the external material 50 in the lower side" and "the receiving plate 5 of the external material clamp A". Therefore, applying the excess load to the external material 50 in the lower side is prevented. In addition, the receiving plate 5 receives a part of the load of the external material in the upper side. Therefore, there is no possibility that the excess load is applied to only the receiving plate 5. Therefore, it is possible to prevent the breakage of the foundation 60 of the wall. So, it is possible to reduce the load applied to the foundation 60 of the wall as well as to prevent the excess load from being applied to the external material 50. Consequently, it is possible to prevent the breakage and the deformation of the external material 50.

Furthermore, as shown in FIG. 1, FIG. 2 A, FIG. 2 B, FIG. 3 A to FIG. 3 C, the receiving plate 5 is a receiving support plate 6. The receiving support plate 6 is formed to project to the fixed plate from the upper support plate 3.

Further, as will be understood from FIG. 1, FIG. 2 A, FIG. 2 B, FIG. 3A to FIG. 3 C, the receiving support plate 6 is formed by cutting out a part of the upper support plate 3 to project to the fixed plate 1.

In this case, there is no need to perform the additional complex work in a case where the receiving plate 5 is realized by the separate components. Therefore, it is possible to easily form the receiving plate 5. Further, the receiving plate 5 is formed by cutting out a part of the upper support plate 4 to project to the fixed plate 1. In other words, the receiving plate 5 is formed by bending a part of the upper support plate 3 toward the fixed plate. Therefore, the receiving plate 5 acts as the plate spring which is fixed at its one end to the upper support plate 3. Therefore, when the receiving plate 5 receives a certain amount of the load or more, the receiving plate 5 is deflected to the lower direction. According to deflecting the receiving plate 5 to the lower direction, the upper-side external material 50 is moved toward the lower-side external material 50. As a result, the lower end of the upper-side external material 50 comes into contact with the upper end of the lower-side external material 50. Therefore, this configuration makes it possible to arrange the upper-side external material 50 and the lower-side external material without gap.

Furthermore, in the upper-side external material 50 comes into contact with the lower-side external material 50, applying the large force to both the upper-side external material 50 and the lower-side external material 50 is prevented.

In addition, in FIG. 4, FIG. 5, and FIG. 6, the receiving plate, the receiving plate 5 is defined by the receiving horizontal plate 7 of the horizontal plate 2.

Further, as shown in FIG. 4, FIG. 5, and FIG. 6, the receiving horizontal plate 7 is formed by cutting out a part of the horizontal plate 2.

Furthermore, the receiving horizontal plate 7 extends to the front-upper direction from the horizontal plate 2.

Also with this configuration, it is possible to omit the complex work when the receiving plate 5 is formed by the separate components. Therefore, it is possible to easily form the receiving plate 5 easily. Further, in the upper-side external material 50 comes in contact with the lower-side external material 50, applying the large load to both the upper-side external material 50 and the lower-side external material 50 is prevented.

Furthermore, in FIG. 7 and FIG. 8, the receiving plate 5 is realized by the receiving fix plate 8 which is formed to project to the front direction from the fixed plate 1.

In addition, the receiving fix plate 8 is formed by cutting out a part of the fixed plate 1.

Also in this case, there is no need to employ the separate components to form the receiving plate 5. Therefore, the complex work may be omitted. Therefore, it is possible to easily form the receiving plate 5. Further, in contacting the upper-side external material 50 with the lower-side external material, applying the large load to both the upper-side external material 50 and the lower-side external material 50 is prevented.

Furthermore, as shown in FIG. 9 A to FIG. 9 H, FIG. 10 A to FIG. 10 H, and FIG. 11, the lower support plate 4 has the fixing support plate 9. The fixing support plate 9 extends to the fixed plate 1.

In particular, the fixing support plate 9 comprises the clipping plate 9a and the clipping tip 9b. The clipping plate 9a extends to back-lower direction from the horizontal plate 2. The clipping tip 9b extends to the front-lower direction from the lower end of the clipping plate 9a. Consequently, the lower support plate 4 has the first cross section which is perpendicular to the lateral direction of the fixed plate 1. The first cross section has a V-shape.

In this case, the fixing support plate 9 comes into elastic contact with the upper end of the front surface of the lower-side external material 50 attached in the lower side. Therefore, the fixing support plate 9 is in cooperation with fixed plate 1 to hold the lower-side external material 50 therebetween. Therefore, it is possible to produce the external material clamp which is configured to support the external material with prevention of the backlash of the external material.

Further, the lower support plate 4 has a pair of the lower support plates 15. The lower support plates 15 are arranged in the lateral direction of the fixed plate 1. The fixing support plate 9 is located between the lower support plates 15.

In this case, the fixing support plate 9 has a width in the lateral direction. Therefore, compared with a case where an entire of the lower support plate 4 is bent to project to the fixed plate 1, it is possible to easily deform the lower support plate 4 in the front-back direction. As a result, it is possible to easily insert the external material 50 into the space formed by the fixing support plate 9. Further, it is possible to clip and hold the external material 50 with the elastic force.

Furthermore, as shown in each figure, the external material clamp A comprises the fixation rib 21. The fixation rib 21 is provided to the upper end portion of the fixed plate 1. The fixation rib 21 is formed over the lateral direction of the fixed plate 1. The fixation rib 21 is a plate which is bent such that the fixation rib 21 is projected to the front direction.

In this case, it is possible to enhance the strength of the fixed plate 1. In particular, even if the horizontal plate 2 receives the load, it is possible to prevent the fixed plate 1 from being bent by the load applied to the horizontal plate 2.

Furthermore, the fixation rib 21 has a lower-inclination plate and an upper-inclination plate. The lower inclination plate extends to the front-upper direction from the upper end of the fixed plate 1. The upper-inclination plate extends to the back-upper direction from the upper end of the lower-inclination plate. Consequently, the fixation rib 21 has a second cross section which is perpendicular to the lateral direction of the fixed plate 1. The second cross section is formed to have an L-shape. The upper-inclination plate is provided with the fixation hole. The fixation hole penetrates from the rear surface to the front surface of the upper-inclination plate.

In this case, fixation rib 21 having a high strength is formed with the fixation hole. Therefore, even if the external material clamp comprises the fixation hole, the external material clamp maintains the high strength.

Furthermore, the external material clamp A further comprises the fixation rib 22. The fixation rib 22 is provided to the lower end portion of the fixed plate 1. The fixation rib 22 is formed over the lateral direction of the fixed plate 1. The fixation rib 22 is realized by the plate which is bent such that the fixation rib 22 projects to the front direction.

Also in this case, it is possible to enhance the strength of the fixed plate 1. In particular, even if the load is applied to the horizontal plate 2, the high strength of the fixed plate 1 makes it possible to prevent the bending of the fixed plate 1.

In addition, the upper support plate 3 is formed in both lateral ends of the horizontal plate 2.

In this case, the horizontal plate 2 holds the upper-side external material 50 with stability. Therefore, the lower end of the upper-side external material 50 is prohibited to move to the front direction.

In addition, each the upper support plate 3 extends to the front-upper direction from the front end of the horizontal plate 2.

In this case, the horizontal plate stably holds the upper-side external material. Therefore, the lower end of the upper-side external material 50 is prohibited to move to the front direction.

In addition, the lower support plate 4 comprises the main plate 4a and the sub plate 4b. The sub plate 4b extends to the front-upper direction from the front end of the center in the lateral direction of the horizontal plate 2. The main plate 4a extends to the lower direction from the front end of the sub plate 4b. Consequently, the lower support plate 4 is cooperative with the front end of the horizontal plate 2 to form the lower support rib 25. The lower support rib 25 is formed over a lateral direction of the fixed plate. The lower support rib 25 has a third cross section which is perpendicular to the lateral direction of the fixed plate. The third cross section is formed to have an L-shape.

In this case, the lower support plate 4 is enhanced its strength.

In addition, the horizontal plate 2 has a first length along a thickness direction of the fixed plate 1. The fixed plate 1 is provided at its both lateral ends with projection members 11. Each the projection member extends in the vertical direction. Each the projection member has a second length along the thickness direction of the fixed plate 1. The second length is set to be shorter than the first length.

In this case, the upper support plate 3 and the upstanding member 11 surely support the upper-side external material 50 therebetween.

Furthermore, each the upstanding member 11 comprises the projection-front plate 12 and the projection-side plate 13. The projection-front plate 12 extends to the front direction from the fixed plate 1. The projection-side plate 13 extends to the lateral direction of the fixed plate 1 from the front end of the projection-front plate 12. The upstanding member 11 is provided at its upper end portion with the smoothly-curved surface. Consequently, "the fixed plate 1", "the projection-front plate 12", and "projection-side plate 13" are connected smoothly. Furthermore, the upstanding member 11 is provided at its lower end portion with the smoothly-curved surface. Consequently, "the fixed plate 1", "the projection-front plate 12", and "the projection-side plate 13" are connected smoothly.

Consequently, the upper-side external material 50 is smoothly attached to the external material clamp 1 along the foundation 60 of the wall. Similarly, the lower-side external material 50 is smoothly attached to the external material clamp 1 along the foundation 60 of the wall.

In addition, the horizontal plate 2 is provided with the horizontal projection member 14. The horizontal projection member 14 is formed to project to the upper direction. The horizontal projection member 14 has the upper surface which is flat surface.

In addition, the horizontal projection member 14 is located in the center of the lateral direction of the horizontal plate 2.

In this case, the horizontal plate is enhanced its strength.

In addition, the horizontal projection member 14 further comprises the receiving horizontal plate 7. The receiving horizontal plate 7 extends to the front-upper direction from the horizontal projection member 14. The receiving horizontal plate 7 defines the receiving plate 5.

Furthermore, as shown in FIG. 5, FIG. 9, and FIG. 10, the horizontal projection member 14 is formed with a slit 14a having a U-shape. The slit 14a has a U-shaped cross section in a plane perpendicular to the thickness direction of the fixed plate 1. The receiving horizontal plate 1 is defined by the area of an inside of the slit 14a having the U-shape. The receiving horizontal plate 7 extends to the front-upper direction to the horizontal projection member 14.

In this case, there is no need to perform the complex work which is required when the receiving plate 5 is formed by the separate components. So, it is possible to easily form the receiving plate 5. Furthermore, in the upper-side external material 50 comes into contact with the lower-side external material 50, applying the large load to both the upper-side external material 50 and the lower-side external material 50 is prevented. In addition, the horizontal plate 2 is enhanced its strength by the horizontal projection member 14. Therefore, even if the receiving plate 5 receives the large load, it is possible to prevent the breakage of the horizontal plate 2.

In addition, it is preferred to employ the external material clamping structure which uses the external material clamp A to fix the external materials 50 to the foundation 60 of the wall of the building. The external material clamp A has the fixed plate 1 which is mounted on and fixed to the foundation 60 of the wall. The lower-side external material 50 attached to the lower side of the external material clamp A is engaged at its upper end with the lower support plate 4, whereby the lower-side external material 50 is supported. The upper-side external material 50 attached to the upper side of the external material clamp A is engaged at its lower end portion with the upper support plate 3, whereby the upper-side external material 50 is supported. In addition, the upper-side external material is in contact with the lower-side external material 50 attached in the lower side. The load of the upper-side external material is fixed such that the upper-side external material is mounted to both "the receiving plate 5" and the lower-side external material 50".

In this case, it is possible to reduce the load applied to the foundation 60 of the wall, whereby applying the excess load to the external material 50 is prevented. Therefore, it is possible to prevent the breakage and the deformation of the external material 50.

REFERENCE SIGNS LIST

1 fixed plate
2 horizontal plate
3 upper support plate
4 lower support plate
5 receiving plate
6 receiving support plate
7 receiving horizontal plate
8 receiving fixing plate
9 fixing support plate
A external material clamp
50 external material
60 foundation of wall

The invention claimed is:

1. An external material clamp comprising:
   a fixed plate being fixed to a foundation of the wall of the building;
   a horizontal plate being formed to extend to a front direction from a center of said fixed plate;
   an upper support plate directly connected to and extending upward from a front end of said horizontal plate;
   a lower support plate directly connected to and extending downward from a front end of said horizontal plate; and
   a receiving plate having a cantilever structure, at least a part of said receiving plate being located above said horizontal plate;
   wherein said external material clamp is configured to fix external materials, which are not components of the external material clamp, to a wall of a building, such that the external materials are arranged in a vertical direction of the wall of the building, the external materials including an upper external material and a lower external material,
   wherein said upper support plate is configured to engage with a lower end of the upper external material to support the lower end of the upper external material,
   wherein said lower support plate is configured to engage with an upper end of the lower external material to support the upper end of the lower external material, and
   wherein said receiving plate is configured to contact with the lower end of the upper external material to support a part of a weight of the upper external material.

2. The external material clamp as set forth in claim 1, wherein
   said receiving plate is a receiving support plate which is formed to extend to a fixed plate from said upper support plate.

3. The external material clamp as set forth in claim 2, wherein
   a part of said upper support plate is cut out to extend to the fixed plate,
   the part of said upper support plate is defined as said receiving support plate.

4. The external material clamp as set forth in claim 1, wherein
   said receiving plate comprises a receiving horizontal plate which is connected to said horizontal plate.

5. The external material clamp as set forth in claim 4, wherein
   said receiving horizontal plate is realized by a part of said horizontal plate which is cut out from said horizontal plate.

6. The external material clamp as set forth in claim 4, wherein
   said receiving horizontal plate extends forwardly and upwardly from said horizontal plate.

7. The external material clamp as set forth in claim 1, wherein
   said receiving plate is a receiving fix plate which extends to the front direction from the fixed plate.

8. The external material clamp as set forth in claim 7, wherein
   said receiving plate is defined by a part of said fixed plate which is cut out from said fixed plate.

9. The external material clamp as set forth in claim 1, wherein
   said lower support plate is formed with a fixing support plate, said fixing support plate extending to said fixed plate, said fixing support plate being cooperative with said fixed plate to hold said external material between the fixing support plate and the fixed plate with a condition where the lower support plate is in contact with an upper end portion of the external material in the lower side.

10. The external material clamp as set forth in claim 9, wherein
    said fixing support plate comprises a clipping plate and a clipping tip,
    said clipping plate being formed to extend to the rear lower direction from said horizontal plate,
    said clipping plate being formed to extend to the front lower direction from a lower end of said clipping plate, whereby said lower support plate has a first cross section perpendicular to a lateral direction of said fixed plate, said first cross section being V-shape.

11. The external material clamp as set forth in claim 9, wherein
    said lower support plate comprises a pair of lower support side plates,
    said lower support side plates being arranged in the lateral direction of said fixed plate,
    said fixing support plate being located between said lower support side plates.

12. The external material clamp as set forth in claim 1, wherein
    said external material clamp further comprises a fixation rib,
    said fixation rib being provided to an upper end of said fixed plate, said fixation rib being formed over a lateral direction of said fixed plate, said fixation rib being a plate which is bent such that said fixation rib is projected to the front direction.

13. The external material clamp as set forth in claim 12, wherein
said fixation rib has a lower inclination plate and an upper inclination plate,
said lower inclination plate extending to a front-upper direction from an upper end of said fixed plate,
said upper inclination plate extends to a rear-upper direction from an upper end of said lower inclination plate, whereby said fixation rib has a second cross section perpendicular to the lateral direction of said fixed plate, said second cross section being a L-shape,
said upper inclination plate being formed with a fixation hole.

14. The external material clamp as set forth in claim 1, wherein
said external material clamp comprises a fixation rib,
said fixation rib being provided to a lower end of said fixed plate, said fixation rib being formed over a lateral direction of said fixed plate, said fixation rib being a plate which is bent such that said fixation rib being projected to the front direction.

15. The external material clamp as set forth in claim 1, wherein
said upper support plate is provided to both lateral ends of said horizontal plate.

16. The external material clamp as set forth in claim 1, wherein
each said upper support plate extends to a front-upper direction from a front end of said horizontal plate.

17. The external material clamp as set forth in claim 1, wherein
said lower support plate has a main plate and a sub plate,
said main plate extends to the front-upper direction from a lateral center of said horizontal plate,
said main plate extends to a lower direction from a front end of said sub plate, whereby said lower support plate is cooperative with a front end of said horizontal plate to form the lower support rib,
said lower support rib being formed over a lateral direction of said fixed plate,
said lower support rib has a third cross section which is perpendicular to the lateral direction of said fixed plate, the third cross section having an L-shape.

18. The external material clamp as set forth in claim 1, wherein
said horizontal plate has a first length along a thickness direction of said fixed plate,
said fixed plate being provided at its both lateral ends with upstanding members, respectively,
each said upstanding member extending in the vertical direction, said upstanding member having a second length along a thickness direction of said fixed plate, the second length being set to be shorter than the first length.

19. The external material clamp as set forth in claim 18, wherein
said upstanding member comprises an upstanding front plate and an upstanding side plate,
said upstanding front plate extending to a front direction from said fixed plate,
said upstanding side plate extending to a lateral direction of said fixed plate from a front end of said upstanding front plate,
said upstanding member being formed at its upper end with a smoothly curved surface, whereby said fixed plate, said upstanding front plate, and said upstanding side plate are smoothly connected.

20. The external material clamp as set forth in claim 1, wherein
said horizontal plate comprises a horizontal projection member,
said horizontal projection member being formed to project to an upper direction,
said horizontal projection member having a top surface which is a flat surface.

21. The external material clamp as set forth in claim 20, wherein
said horizontal projection member is located in a lateral center of said horizontal plate.

22. The external material clamp as set forth in claim 21, wherein
said horizontal projection member further comprises a receiving horizontal plate,
said receiving horizontal plate being formed to extend to a front-upper direction from said horizontal projection member,
said receiving horizontal plate defining said receiving plate.

23. The external material clamp as set forth in claim 21, wherein
said horizontal projection member is formed to have a slit having a U-shape,
said slit having a U-shaped cross section in a plane perpendicular to a vertical direction of said fixed plate,
said receiving horizontal plate being defined by a region of an inside of said slit,
said receiving horizontal plate being formed to extend to a front-upper direction from said horizontal projection member.

24. An external material clamping structure for fixing the external material to the foundation of the wall of the building with said external material clamp as set forth in claim 1, wherein
said fixed plate of the external material clamp is fixed to the foundation of the wall,
the external material in a lower side of said external material clamp being engaged at its upper end portion with said lower support plate to support the external material,
a lower end portion of the external material in an upper side of said external material clamp being engaged with and supported by said upper support plate, the lower end portion of said external material in an upper side of said external material clamp being in contact with both said external material in the lower side and said receiving plate, whereby a load of said external material is shared by both said external material in the lower side and said receiving plate.

* * * * *